United States Patent
Mito et al.

(10) Patent No.: US 6,687,712 B2
(45) Date of Patent: Feb. 3, 2004

(54) SCIENTIFIC INFORMATION VIEWING SYSTEM, AND A HOST COMPUTER AND A VIEWING COMPUTER THEREFOR

(75) Inventors: Yasuhiro Mito, Kyotanabe (JP); Katsuhiro Nakagawa, Kameoka (JP)

(73) Assignee: Shimadzu Corporation, Kyoto (JP)

(*) Notice: Subject to any disclaimer, the term of this patent is extended or adjusted under 35 U.S.C. 154(b) by 366 days.

(21) Appl. No.: 09/745,418

(22) Filed: Dec. 26, 2000

(65) Prior Publication Data

US 2002/0004794 A1 Jan. 10, 2002

(30) Foreign Application Priority Data

Jul. 7, 2000 (JP) .......................................... 2000-206183

(51) Int. Cl.[7] .............................................. G06F 17/30
(52) U.S. Cl. ............................ 707/104.1; 707/3; 707/5; 709/218
(58) Field of Search ............................. 707/3, 5, 104.1, 707/10, 102; 700/237; 705/3, 1, 14, 7, 38, 35; 428/64.1; 709/218; 706/59; 358/1.14

(56) References Cited

U.S. PATENT DOCUMENTS

| | | | | |
|---|---|---|---|---|
| 5,446,575 A | * | 8/1995 | Lysakowski, Jr. | 707/104.1 |
| 5,715,169 A | * | 2/1998 | Noguchi | 700/237 |
| 5,845,255 A | * | 12/1998 | Mayaud | 705/3 |
| 5,926,808 A | * | 7/1999 | Evans et al. | 707/3 |
| 6,009,415 A | * | 12/1999 | Shurling et al. | 705/35 |
| 6,098,062 A | * | 8/2000 | Janssen | 706/59 |
| 6,292,796 B1 | * | 9/2001 | Drucker et al. | 707/5 |
| 6,381,029 B1 | * | 4/2002 | Tipirneni | 358/1.14 |
| 6,413,607 B1 | * | 7/2002 | Kasada et al. | 428/64.1 |

* cited by examiner

Primary Examiner—Charles Rones
Assistant Examiner—Hassan Mahmoudi
(74) Attorney, Agent, or Firm—Rader, Fishman & Grauer PLLC

(57) ABSTRACT

An uploading computer, a host computer and a viewing computer are interconnected through communication lines. The host computer hierarchizes software information received from the uploading computer by field, category and software product to be stored in software information memory. In response to search information inputted from the viewing computer, the software information is displayed as search results on the viewing computer. The software information hierarchized in the order of field, category and software product is retrieved quickly and displayed immediately to browsed efficiently.

9 Claims, 20 Drawing Sheets

SCIENTIFIC INFORMATION VIEWING SYSTEM, AND A HOST COMPUTER AND A VIEWING COMPUTER THEREFOR

BACKGROUND OF THE INVENTION

Field of the Invention

This invention relates to a scientific information viewing system for viewing scientific information which is information relating to scientific fields through communication lines, and a host computer and a viewing computer for use with the system. In particular, the invention relates to a technique for efficiently searching and viewing scientific information.

Scientific fields include various fields such as biology, chemistry, physics, medicine and so on, and cover extensive ranges. Thus, a computer system is used to search and view, through the Internet, for example, information relating to the scientific fields (hereinafter called "scientific information" as appropriate), such as scientific/technical software, information regarding academic societies or exhibitions, advertisements and so on.

Specifically, organizations operating in the scientific fields, such as laboratories, business enterprises relating to science, and individual persons interested in science, set up Web sites or home pages by using a computer system to offer the above scientific information on computers, thereby to disclose the information to people (hereinafter called "the user" as appropriate) wishing to view such information through the computer system.

On the other hand, the user may access directly to the Web sites of the organizations in the scientific fields by using the computer system, make a search by inputting key words through a search device (search engine), or access desired information by using mail magazines.

However, the user encounters the following inconvenience in accessing the above scientific information by using a conventional computer system.

It is very troublesome to search and view desired information.

The user not knowing the addresses of sites (URLs or Uniform Resource Locators, e.g. Http://www . . .) must make a search through a search device as noted above. Since the scientific fields cover extensive ranges as noted above, such results could reach several thousands to several tens of thousands, depending on information sought or key words inputted. To confirm whether the information serves the purpose, the user must check each of the numerous search results.

The Web sites are set up individually. Even when the user knows the address of one site, he or she may fail to find desired information at this site. Then, the user must make a new attempt to access a different Web site.

In particular, the development of computer technology has produced overwhelming quantities of information on scientific and technical software. When purchasing software by relying, for example, on information on software used in a scientific field (hereinafter called "software information" as appropriate), information relating to that software retrieved may be insufficient. To determine whether the software is what the user desires to obtain, it may be necessary to run the software for demonstration. In practice, "demonstration downloading" is often offered at Web sites for the user to test the performance of software before purchase. Thus, it takes time to examine one piece of software, and great trouble must be taken before the user reaches a desired piece of software.

SUMMARY OF THE INVENTION

This invention has been made having regard to the state of the art noted above, and its object is to allow desired scientific information to be searched and viewed in an efficient way.

The above object is fulfilled, according to this invention, by a scientific information viewing system comprising an uploading computer for uploading scientific information which is information relating to scientific fields, a host computer for storing the scientific information, and a viewing computer for viewing the scientific information, the computers being interconnected through communication lines, wherein the uploading computer includes a first display/input device for displaying and inputting the scientific information; the host computer includes a storage device for storing the scientific information as hierarchized at at least three levels of field, category and software product, and a search device for searching and retrieving given scientific information from the storage device; the viewing computer includes a second display/input device for displaying the scientific information and inputting search information for searching the scientific information; the uploading computer transmitting the scientific information inputted by the first display/input device to the host computer through one of the communication lines; the host computer hierarchizing the scientific information and storing the scientific information in the storage device; the viewing computer transmitting the search information inputted by the second display/input device to the host computer through the other communication line; the host computer searching the scientific information stored in the storage device, based on the search information, and transmitting search results to the viewing computer through the other communication line; and the viewing computer displaying the search results for browsing.

In the system according to this invention, the scientific information inputted by the first display/input device of the uploading computer is transmitted from the uploading computer through the communication line to the host computer. The scientific information transmitted to the host computer is stored in the storage device as hierarchized at at least three levels of field, category and software product. The search information inputted by the second input/display device of the viewing computer is transmitted from the viewing computer through the communication line to the host computer. Based on the search information transmitted to the host computer, the search device searches the scientific information stored in the host computer. Search results are transmitted from the host computer through the communication line to the viewing computer.

In time of the search, the scientific information has been arranged in a hierarchy. When the search information is applied to the host computer from the viewing computer, the search device outputs search results immediately. The search results are transmitted from the host computer to the viewing computer. Thus, when the search information is inputted in the order of field, category and software product by the second display/input device of the viewing computer, the scientific information is immediately displayed as search results on the viewing computer to enable an efficient browsing.

In this invention, one example of the scientific information is software information which is information on software for use in scientific fields. In this case, the software information transmitted from the uploading computer to the host computer is stored in the storage device as hierarchized at at least three levels of field, category and software product. With the search information transmitted from the viewing computer to the host computer, the search device allows the software information to be displayed immediately as search results on the viewing computer to realize an efficient browsing.

Other examples of the scientific information are academic society and exhibition information which is information on academic societies and exhibitions, and advertisement information which is information on advertisements. In this case, as in the case of software information, the information transmitted from the uploading computer to the host computer is stored in the storage device as hierarchized at at least three levels of field, category and software product. With the search information transmitted from the viewing computer to the host computer, the search device allows the software information to be displayed immediately as search results on the viewing computer to realize an efficient browsing.

Preferably, the host computer includes a translating device for translating the scientific information into different languages. The translating device is operable to translate the scientific information into different languages. The user may view scientific information from abroad as well as from the home country, or transmit such software information to the host computer. Thus, the system according to this invention may be used worldwide.

Preferably, the software information noted above includes sample information (e.g. demonstration downloading) for trying out software. In this case, the user can immediately determine, only by viewing the sample information, whether the software is necessary to the user or not. It is also preferred that the software information includes user information which is information on the user. In this case, the user may view the user information. The supplier may improve the software product by reflecting the user information on the software product.

Preferably, the user information includes point accumulating information for accumulating points according to trial reports provided by the user. The scientific information may be given to the user having provided the trial reports based on the points accumulated. Points are accumulated in the user information whenever the user inputs a trial report. When a certain point count has been reached, the user may be given scientific information in return for the trial reports provided. In this way, the user may be encouraged to provide trial reports, hoping to obtain the scientific information. Thus, the system according to this invention has an incentive scheme function for promoting access from the user.

In a preferred embodiment of this invention, the up-loading computer transmits, besides the scientific information such as the software information noted above, supplier identification information (e.g. the names of companies in scientific fields, suppliers' addresses, suppliers' fax numbers, suppliers' URLs (Uniform Resource Locators) and e-mail addresses inputted by the first display/input device to the host computer through the communication line. Thus, with identification information inputted as search information by the second display/input device, the identification information may be viewed along with the software information with ease. Software may be purchased based on the identification information.

The host computer for use in the system according to this invention may comprise a storage device for storing scientific information as hierarchized at at least three levels of field, category and software product, and a search device for searching and retrieving given scientific information from the storage device.

This host computer allows the viewing computer to display the scientific information as search results immediately, to realize an efficient browsing.

The viewing computer for use in the system according to this invention may comprise a second display/input device for displaying the scientific information and inputting search information for searching the scientific information.

This viewing computer can display the scientific information as search results immediately, to realize an efficient browsing.

In one preferred display mode of the viewing computer, the second display/input device comprises a scientific information screen for displaying the scientific information, the scientific information screen being started by an input operation made through a keyboard and a mouse to allow a browsing of the scientific information. In this case, the scientific information may be viewed on the scientific information screen acting as the second display/input device.

Further, the scientific information screen, preferably, displays search information inputted from the keyboard and mouse as a basis for searching the scientific information, and displays search results corresponding to the search information. In this case, the scientific information is displayed immediately as search results limited in scope, to allow an efficient browsing.

Further, the scientific information screen, preferably, includes input boxes for entering search information relating to at least a field, a category and a software product. In this case, with the search information inputted to the input boxes, the scientific information is displayed immediately as search results limited in scope and in the order of field, category and software product. Preferably, the scientific information screen includes, in addition to the input boxes noted above, supplier information input boxes for entering supplier information which is information on suppliers offering the scientific information. In this case, a search is made of the scientific information corresponding to the supplier information entered to the supplier information input boxes. Consequently, the scientific information is displayed immediately as search results further limited in scope. It is preferred that the supplier information input boxes include a name input box for entering names of suppliers offering the scientific information. With a name entered to the name input box, the scientific information is displayed immediately as search results further limited in scope. The supplier names noted above may include the names of companies offering the scientific information, for example.

In a further preferred display mode of the viewing computer, the scientific information screen may include a name search screen for searching names of suppliers offering the scientific information, a translation request reception screen for accepting requests for translation, an advertisement reception screen for accepting advertisements, or an academic society and exhibition viewing screen for viewing information on academic societies and exhibitions. Desired information may be viewed on the scientific information screen by operating each of the above screens with the keyboard and mouse.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Preferred embodiments of this invention will be described in detail hereinafter with reference to the drawings.

Figure 1:
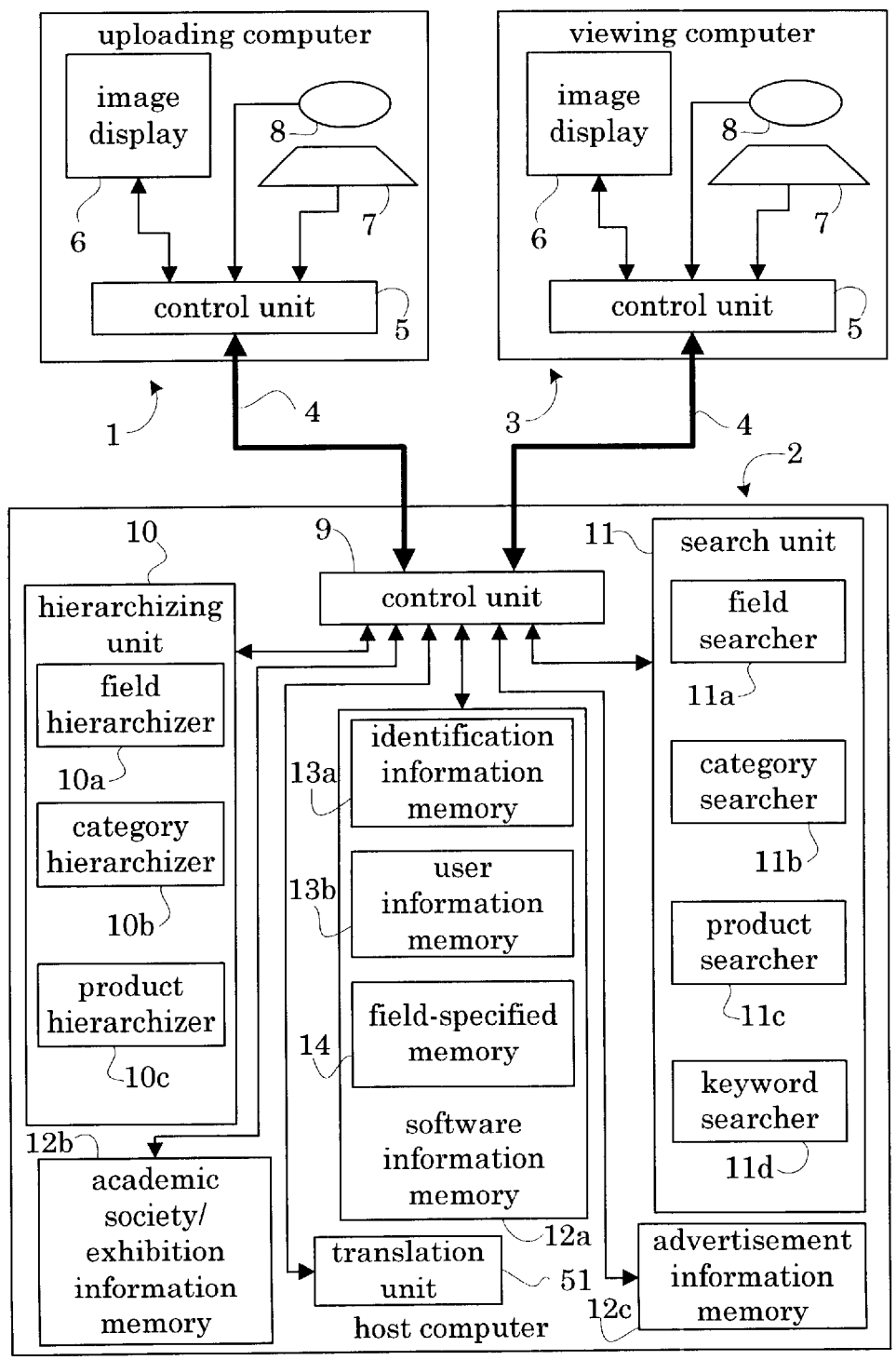
FIG. 1 is a schematic view of a principal portion of an information viewing system according to this invention.
Figure 2:
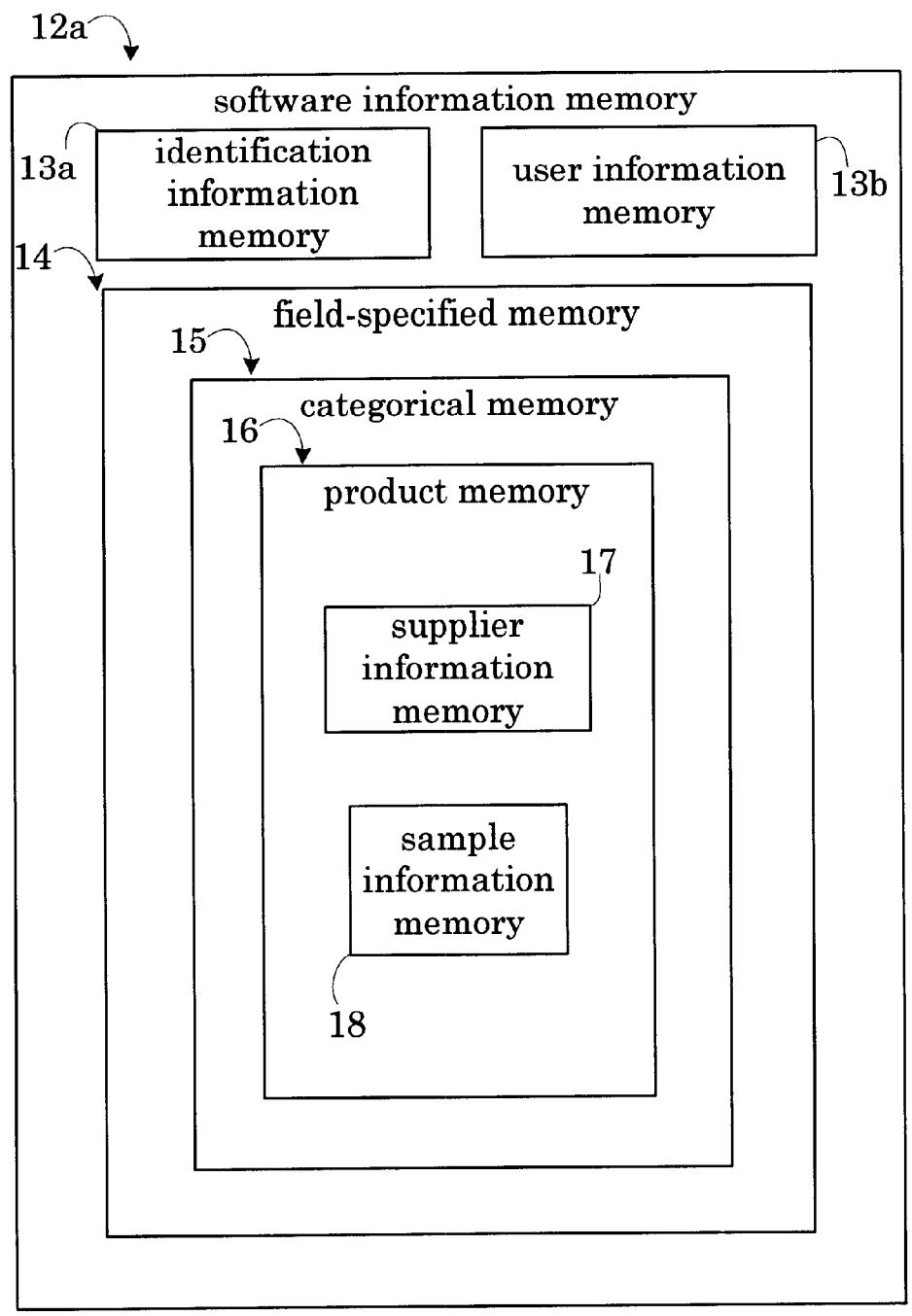
FIG. 2 is a schematic view of a software information memory used in the viewing system.
Figure 3:
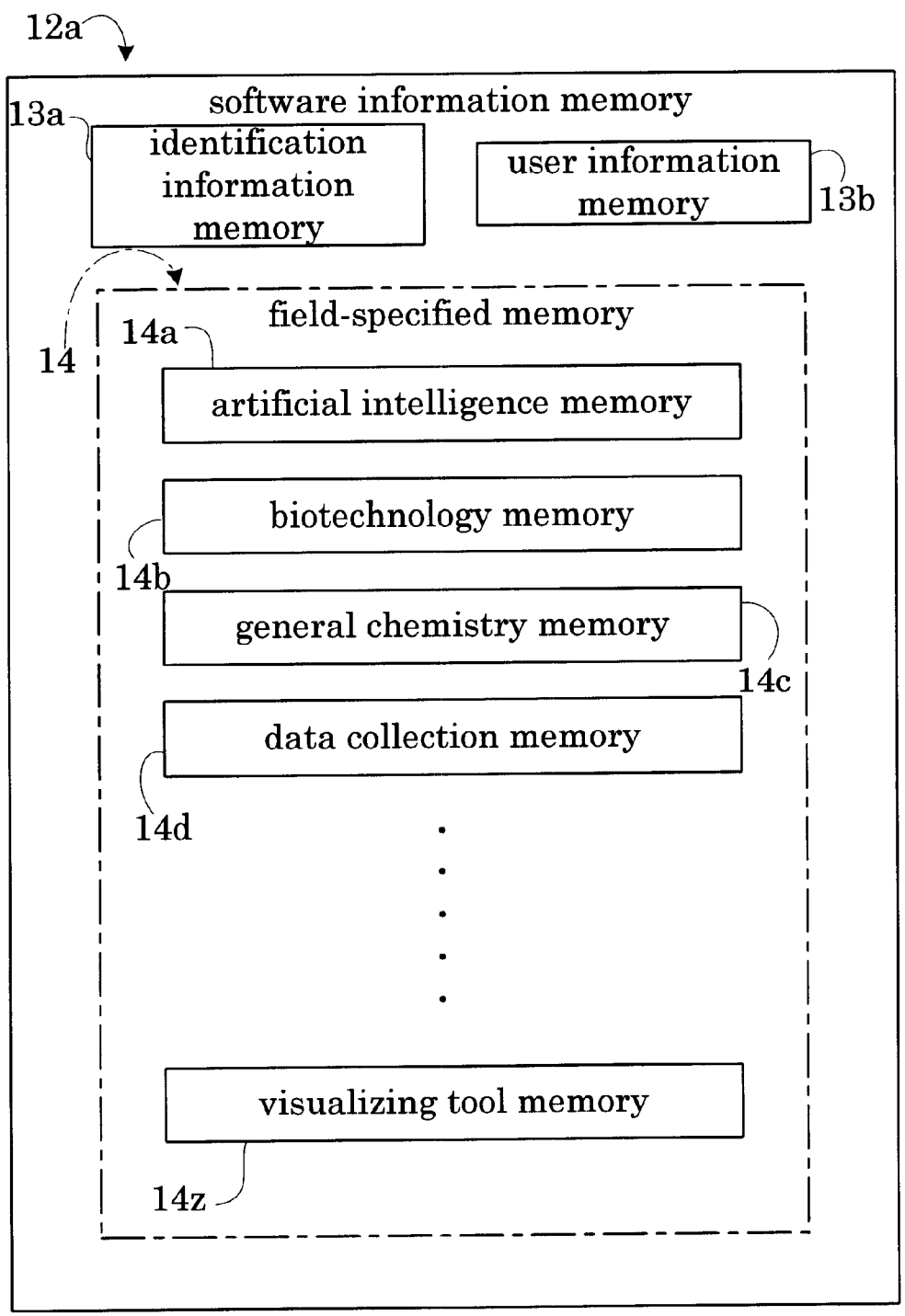
FIG. 3 is a schematic view of a field-specified memory within the software information memory.
Figure 4:
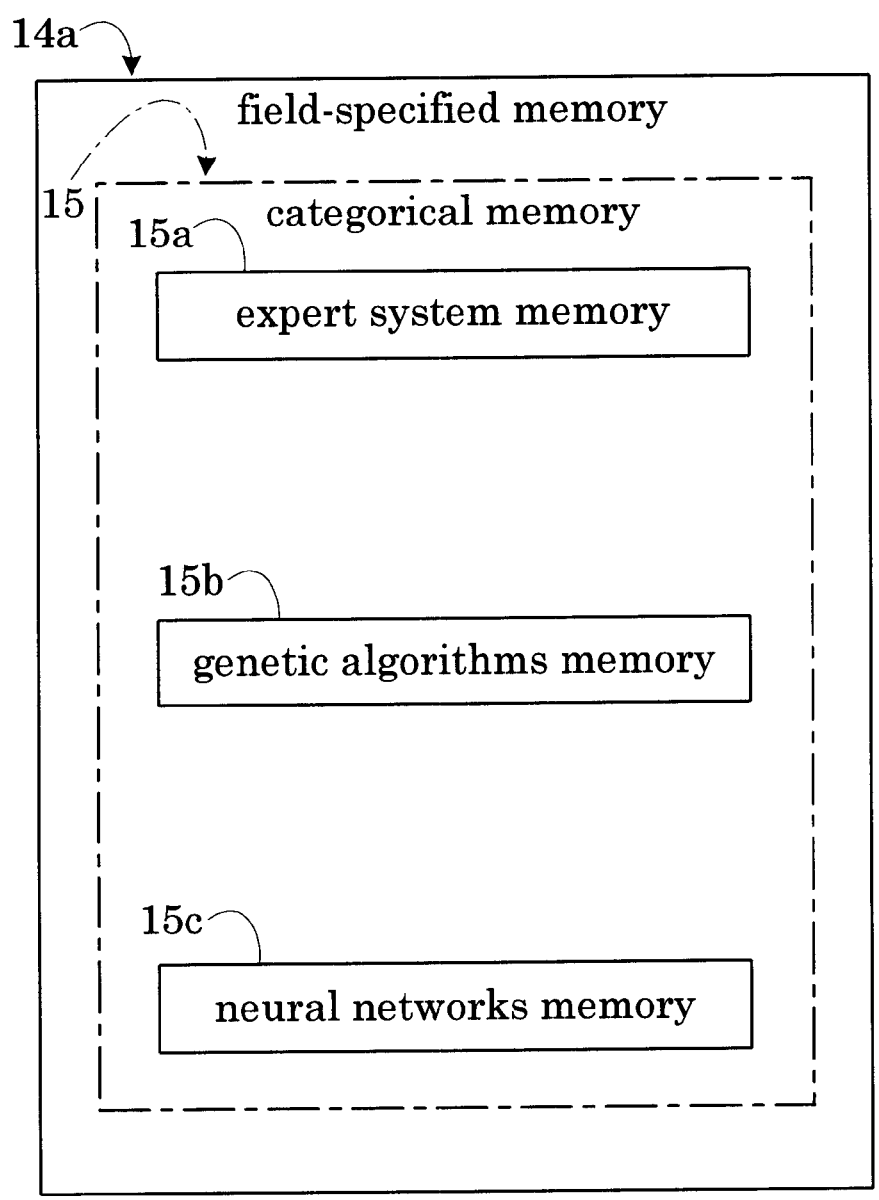
FIG. 4 is a schematic view of a categorical memory within the field-specified memory.

FIG. 1 is a schematic view of a principal portion of an information viewing system according to this invention. FIG. 2 is a schematic view of a software information memory for storing software information. FIG. 3 is a schematic view of a field-specified memory within the software information memory. FIG. 4 is a schematic view of a categorical memory within the field-specified memory. The viewing system in this embodiment will be described with emphasis placed on software information.

As shown in FIG. 1, the system includes an uploading computer 1, a host computer 2 and a viewing computer 3 connected to one another through communication lines 4, typically through signal lines, interfaces and/or cables, for example. In the case of the Internet, telephone lines act as the communication lines 4. In this system, the uploading computer 1 and viewing computer 3 are provided as separate from each other to avoid confusion. The two computers have the same construction. Thus, either one of the computers may act as the uploading computer 1 when used to upload software information, and as the viewing computer 3 when used to view the software information. Of course, the two computers may comprise those having different constructions.

Each of the uploading computer 1 and viewing computer 3 includes a control unit 5 for supervising and controlling operation of the computer, a screen display unit 6 for displaying images on a monitor, and input devices such as a keyboard (console) 7 and a mouse (pointing device) 8.

Figure 5:
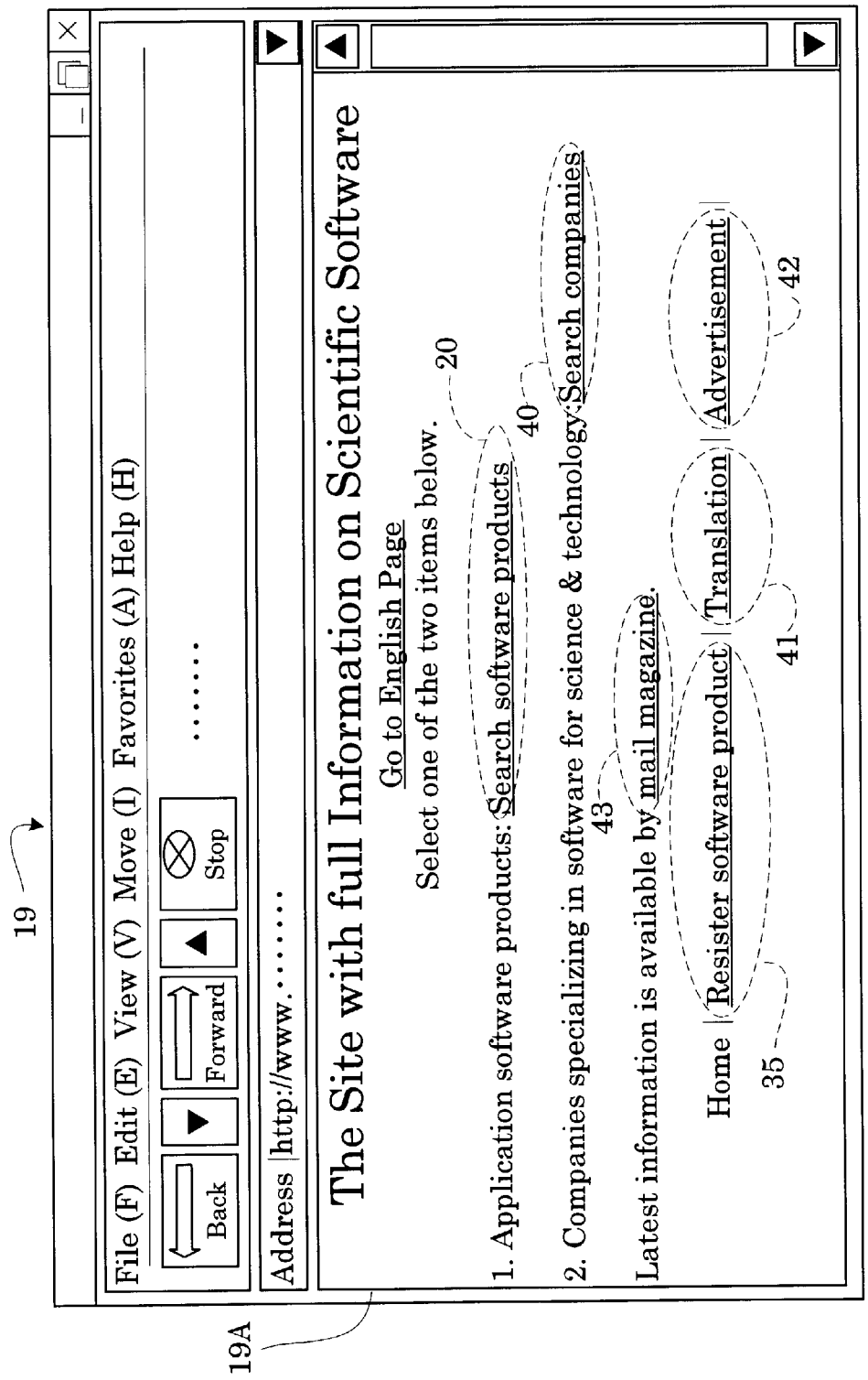
FIG. 5 is a view of a software information screen displaying software information.

The screen display unit 6 displays a software information screen 19 presenting software information as shown in FIG. 5. This software information screen 19 can display such software information and accept inputs. In the case of the Internet, a browser acts as the software information screen 19. When connected to the host computer 2, the software information screen 19 displays contents set to the host computer 2 (e.g. initial conditions (defaults), display settings of input boxes and buttons, and so on, to be described hereinafter) and received through the communication line 4. The software information screen 19 of uploading computer 1 corresponds to the first display/input device in this invention. The software information screen 19 of viewing computer 3 corresponds to the second display/input device in this invention.

A specific construction of host computer 2 will be described next. As shown in FIG. 1, the host computer 2 includes a control unit 9 for supervising and controlling operation of host computer 2, a hierarchizing unit 10 for hierarchizing software information, a search unit 11 for searching software information, and a software information memory 12a for storing software information. The hierarchizing unit 10 and software information memory 12a are used to hierarchize and accumulate software information in the host computer 2. The hierarchizing unit 10 and software information memory 12a correspond to the storage device in this invention. The search unit 11 corresponds to the search device in this invention.

Besides the foregoing components, the host computer 2 includes memories, such as an academic society and exhibition information memory 12b and an advertisement information memory 12c, for storing scientific information which is information relating to scientific fields. As do the uploading computer 1 and viewing computer 3, the host computer 2 has a screen display unit and input devices such as a mouse and a keyboard not shown. With these components, the host computer 2 is operable to perform maintenance and update the scientific information including the software information noted above.

A specific construction of the hierarchizing unit 10 in the host computer 2 will be described next. The hierarchizing unit 10 is formed of a CPU, for example, and as shown in FIG. 1, includes a field hierarchizer 10a for hierarchizing the software information by field, a category hierarchizer 10b for hierarchizing, by category, the software information hierarchized by field, and a product hierarchizer 10c for further hierarchizing the software information hierarchized by category into individual software products. Thus, in this embodiment, the hierarchizing unit 10 hierachizes the software information at the three levels of field, category and software product. For example, the category may be divided into a first category group and a second category group which is a subdivision of the first, resulting in the four hierarchical levels of field, first category, second category and software product. Companies in the scientific fields may be added to the field, category and software product to make a hierarchy of field, category, company and software product. This invention is not limited to any hierarchic system as long as the software information is hierarchized at at least the three levels of field, category and software product.

A specific construction of the search unit 11 in the host computer 2 will be described next. The search unit 11 is formed of the CPU, for example, and as shown in FIG. 1, includes a field searcher 11a for searching the software information by field, a category searcher 11b for searching, by category, the software information searched and retrieved by field, and a product searcher 11c for searching, by product, the software information searched and retrieved by category, and a keyword searcher 11d for searching the software information based on a key word or words inputted on the software information screen 19. Thus, a key word, field, category and software product inputted from the software information upper screen 19 serve as search information in this invention.

A specific construction of the software information memory 12a in the host computer 2 will be described next. The software information memory 12a is formed of a storage such as RAM or ROM, and as shown in FIG. 1, includes an identification information memory 13a for storing identification information on suppliers, a user information memory 13b for storing user information such as user names and tryout reports from users, and a field-specified memory 14 for storing the software information hierarchized by field. The identification information on the suppliers includes, for example, the names of companies in the scientific fields, the addresses, fax numbers, URLs (Uniform Resource Locators) and e-mail addresses of information offering parties.

A specific construction of field-specified memory 14 will be described next with reference to FIG. 3. As noted in the "Description of the Related Art" herein, the field level in the hierarchy is divided into biology, chemistry, physics, medicine and so on. As shown in FIG. 3, for example, the field-specified memory 14 is divided into a memory 14a for artificial intelligence, a memory 14b for biotechnology, a memory 14c for chemistry in general, a memory 14d for data collection, . . . and a memory 14z for visualizing tools. The software information in each different field is stored in an appropriate one of the above memories. Of course, the field-specified memory 14 may be divided into memories for other fields than those cited above.

As shown in FIG. 2, each divided field-specified memory 14 has a categorical memory 15 for storing the software information hierarchized by category. A specific construction of the categorical memory 15 will be described with reference to FIG. 4.

Take the artificial intelligence memory 14a for example. As shown in FIG. 4, the categorical memory 15 is divided into an expert system memory 15a, a genetic algorithms memory 15b and a neural networks memory 15c. That is, the "expert system", "genetic algorithms" and "neural networks" form categories of artificial intelligence. The categorical memory 15 is divided in the same way in each of the other field-specified memories 14, i.e. the memory 14b for biotechnology, the memory 14c for chemistry in general, the memory 14d for data collection and the memory 14z for visualizing tools.

As shown in FIG. 2, each divided categorical memory 15 has a product memory 16 for storing the software information hierarchized by software product.

A specific construction of the product memory 16 will be described next. As shown in FIG. 2, the product memory 16 includes a supplier information memory 17 for storing supplier information, and a sample information memory 18 for storing sample information. The supplier information may include, for example, the names of companies in the scientific field having supplied the software information. The sample information may include demonstration downloads, selling points indicating the features of software, and descriptions outlining the products.

Figure 6:
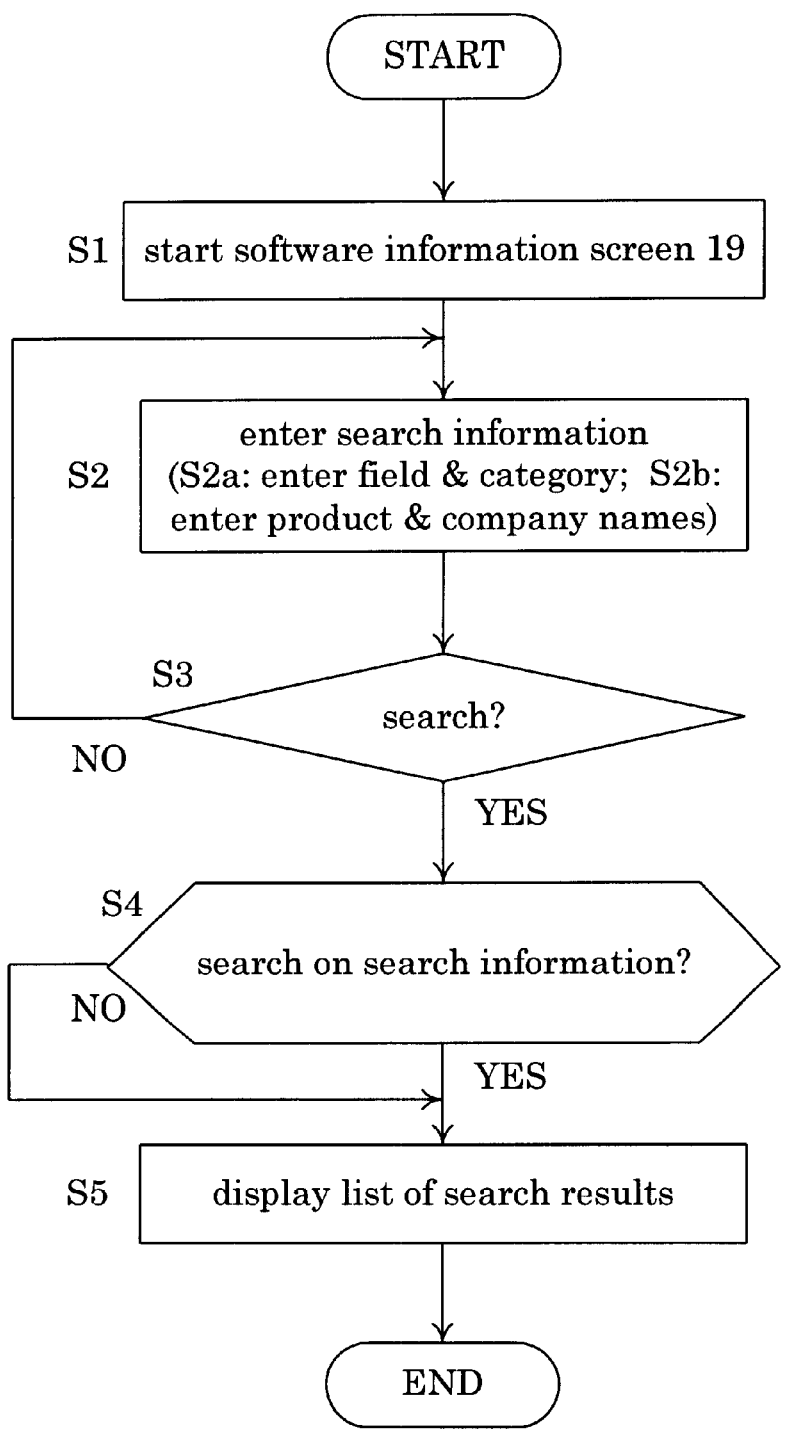
FIG. 6 is a flow chart of a sequence from startup of the software information screen to browsing of software information.

A procedure for viewing the software information will be described next. This procedure is followed by the user in operating the viewing computer 3 to start the software information screen 19 and ultimately to view the software information. This procedure will be described with reference to the software information screens shown in FIGS. 5 and 8–11, the flow chart of FIG. 6 and the hierarchical chart of FIG. 7.

(Step S1) Start Software Information Screen 19

The user operates the viewing computer 3 to start the software information screen 19 through the screen display unit 6. As a result, the software information screen 19 shown in FIG. 5 appears on the monitor of viewing computer 3. In the case of the Internet, the software information screen 19 is displayed by starting a browser. Upon startup, a top page screen 19A is displayed on the software information screen 19 as shown in FIG. 5. When performing various operations with the system of this embodiment, including not only a search for software information but also, for example, offering of software information (registration of software products) to be described hereinafter, pertinent items on the top page screen 19A shown in FIG. 5 may be selected to link to (i.e. access) a screen for a selected operation.

(Step S2) Enter Search Information

Figure 8:
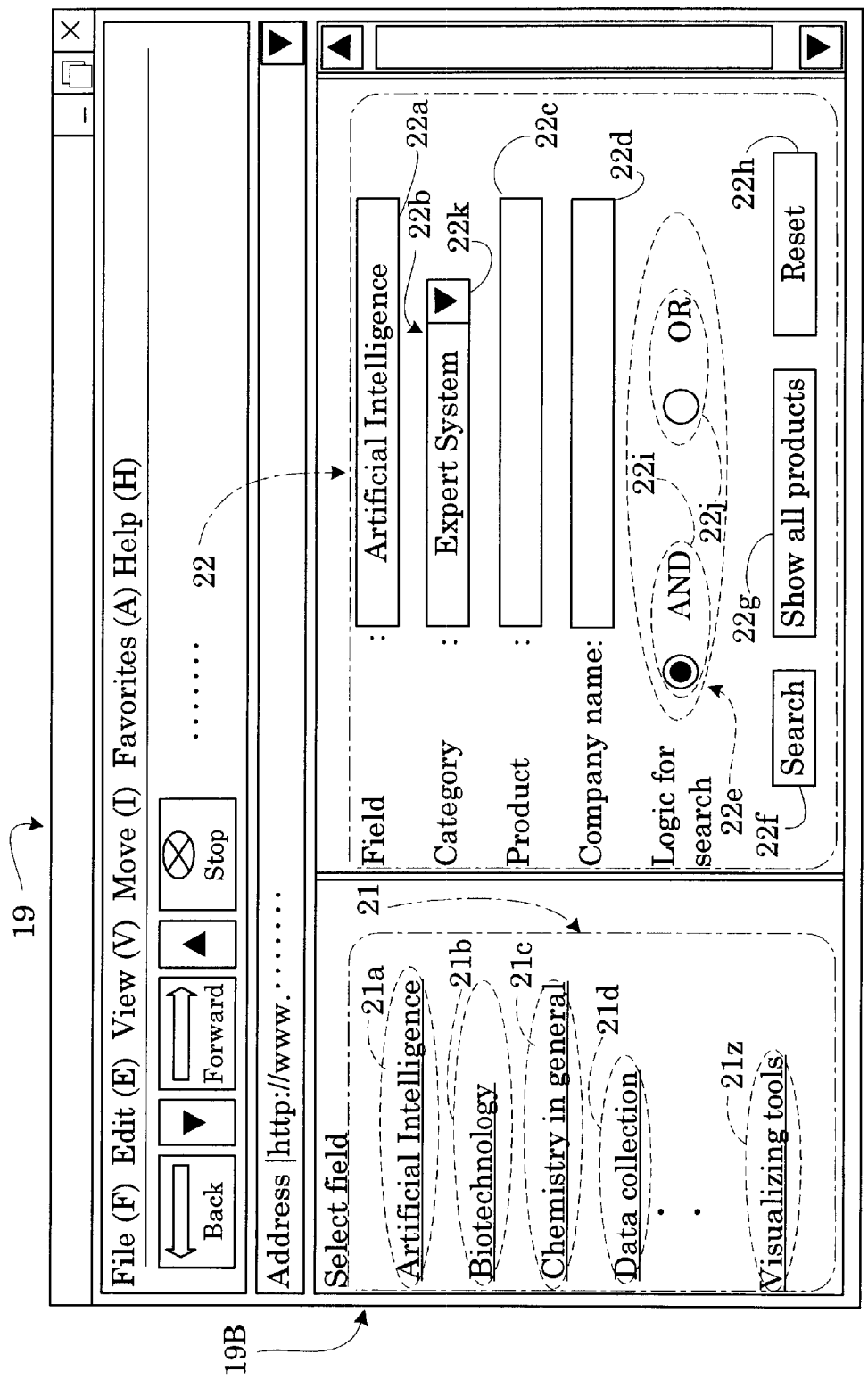
FIG. 8 is a view showing a software information search screen for inputting information for searching software information.

When, for example, the user clicks the mouse 8 on a portion 20 for "Search software products" (hereinafter called "software product search button 20") on the top page screen 19A, a link is made to a software information search screen 19B as shown in FIG. 8. The software information search screen 19B has various scientific field select buttons 21 arranged in a left column for selecting a scientific field. These buttons 21, as shown in FIG. 8, include an artificial intelligence select button 21a acting as a button corresponding to "Artificial Intelligence", a biotechnology select button 21b for "Biotechnology", a chemistry in general select button 21c for "Chemistry in General", a data collection select button 21d for "Data Collection" and a visualizing tool select button 21z for "Visualizing Tools".

Further, the software information search screen 19B has input boxes 22 arranged in a right column for inputting search information. The input boxes 22 include a field input box 22a for inputting search information on scientific fields, a category input box 22b for inputting search information on categories, a product input box 22c for inputting search information on software products, a company name input box 22d for inputting the names of companies offering software information (i.e. having registered software products), logic select buttons 22e for selecting whether the search based on the key word entered to each box should be carried out by "AND" or "OR" function, a search button 22f for executing a search based on the above search information, an all product display button 22g for searching and displaying all software products regardless of the field, category, software product and key word, and a reset button 22h for resetting the above search information. The category input box 22b is in a pulldown form to appear on the software information search screen 19B. The logic select buttons 22e include an AND button 22i for selecting "AND", and an OR button 22j for selecting "OR". One of these buttons is selected to become active (the circle in black in FIG. 8), for example, by clicking the mouse 8 thereon, rendering the other button inactive (the circle in white in FIG. 8).

While the system in this embodiment provides the company name input box 22d, a box for entering supplier information may be provided for searching software products and software information originated with individual persons interested in science.

When the software information search screen 19B is called, as shown in FIG. 8, "Artificial Intelligence" has already been inputted to the field input box 22a, and "Expert System" to the category input box 22b, as initial conditions (i.e. defaults). The system may of course be set such that these boxes are blank when the software information search screen 19B is called.

It is not necessary to make entries to all the input boxes 22, i.e. the field input box 22a, category input box 22b, product input box 22c and company name input box 22d. That is, since "Artificial Intelligence" has already been inputted to the field input box 22a, and "Expert System" to the category input box 22b, as defaults, this system can perform a search as long as at least the search information is inputted to the field input box 22a and category input box 22b. Of course, search information inputted to all the input boxes 22 is greater in amount than the search information inputted only to the field input box 22a and category input box 22b. Consequently, software information retrieved based on the search information inputted to all the input boxes 22 is more limited in scope or amount than that based on the search information inputted only to the field input box 22a and category input box 22b.

A method of inputting search information will be described next, taking the case of selecting artificial intelligence as the field for example.

(Step S2a) Enter Field and Category

First, the operator clicks the mouse 8 on the artificial intelligence select button 21a. Then, "Artificial Intelligence" is transmitted as search information for the field to the host computer 2 via the control unit 5 and communication line 4. Based on the search information "Artificial Intelligence", the field searcher 11a accesses the field-specified memory 14 via the control unit 9 (① in FIG. 7). Since "Artificial Intelligence" has been selected, the field searcher 11a accesses the artificial intelligence memory 14a, and reads "Expert System", "Genetic Algorithms" and "Neural Networks" which are the categories in the artificial intelligence memory 14a. These categories read are transmitted to the viewing computer 3 via the control unit 9 and communication line 4, and transmitted further via the control unit 5 to the screen display unit 6 to be displayed on the software information screen 19.

These categories are displayed on the software information search screen 19B on the software information screen 19 as shown in FIG. 8. Specifically, "Artificial Intelligence" appears in the field input box 22a as a result of clicking on the artificial intelligence select button 21a, and a category of artificial intelligence appears in the category input box 22b.

Figure 9:
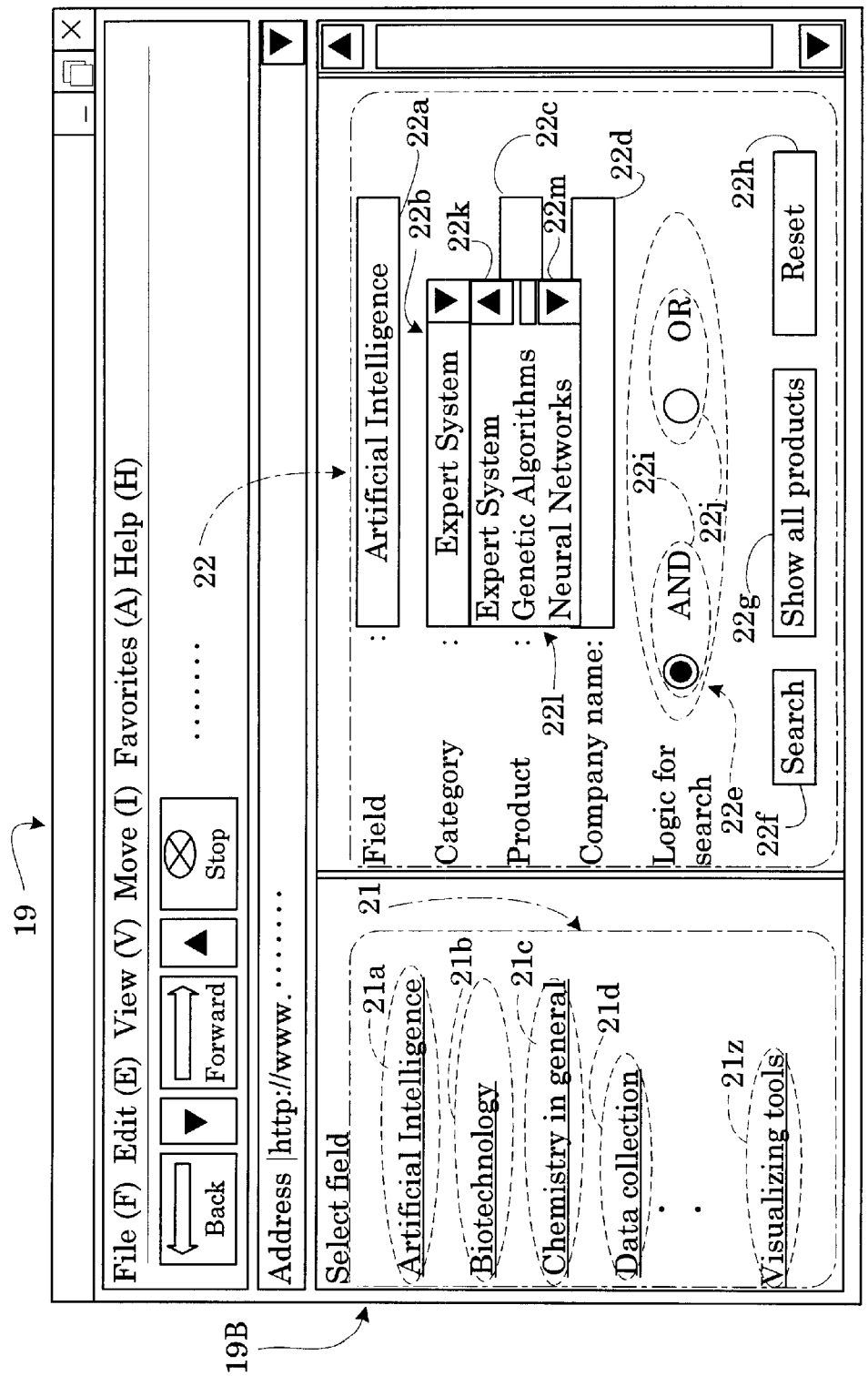
FIG. 9 is a view showing the software information search screen with a pull-down menu of category input options displayed in superimposition.

In this case, as shown in FIG. 8, only "Expert System" is displayed in the category input box 22b. However, when the user clicks the mouse 8 on a pull-down button 22k to the right of the category input box 22b, for example, a pull-down menu 22l is displayed in superimposition as shown in FIG. 9. This pull-down menu 22l shows all the categories of artificial intelligence, i.e. "Expert System", "Genetic Algorithms" and "Neural Networks". One of these categories may be selected by working with a scroll bar 22m of pull-down menu 22l and clicking the mouse 8 on a desired category included in the pull-down menu 22l. The category selected is entered to the category input box 22b. When, for example, "Neural Networks" is selected, "Neural Networks" appears in the category input box 22b. When "Expert System" is left unchanged, the operation proceeds straight to the next stage for inputting product and company names (step S2b) without, of course, causing the pull-down menu 22l to be displayed.

One of the scientific field select buttons 21, such as the artificial intelligence select button 21a, is used, as described above, to retrieve the categories and enter a desired one of them. A desired category may be entered manually and directly without using a scientific field select button 21, as follows. For example, the user clicks the mouse 8 with its pointing device touching the field input box 22a, and operates the keyboard 7 to enter a desired field to the field input box 22a. Similarly, a desired category may be entered manually from the keyboard 7 to the category input box 22b.

In making manual inputs directly to the field input box 22a and category input box 22b, no discrepancy is allowable between the field and category inputted. A discrepancy occurs when, for example, "Artificial Intelligence" is selected for the field by manually entering "Artificial Intelligence" to the field input box 22a, and then "Bibliographic", which is a category of "Biotechnology" and not one of "Artificial intelligence", is manually entered to the category input box 22b. In the case of such a discrepancy, the system in this embodiment displays an error message, for example.

(Step S2b) Enter Product and Company Names

Product and company names are entered after the field and category are entered as described above. When entering a product name, the user clicks the mouse 8 with its pointing device touching the product input box 22c, and operates the keyboard 7 manually and directly to enter a software product to be retrieved to the product input box 22c. When entering a company name, the user clicks the mouse 8 with its pointing device touching the company name input box 22d, and operates the keyboard 7 manually and directly to enter the name of the company having registered the software product to the company name input box 22d. Then, the user clicks either the AND button 22i or the OR button 22j of logic select buttons 22e. After all the search information is inputted, the operation moves to a subsequent step, Step S3, for search determination.

It is not absolutely necessary to enter the entire name of a product or company, but only a character string forming part of the name may be typed as a key word. When searching for a software product "IJKTM", for example, only letters "IJ", "TM" or "JK" forming part of the name "IJKTM" may be typed in the product input box 22c. When searching for a software product offered by "ABCD Corporation", only "AB" or "CD" may be typed in the company name input box 22d.

When "LMN" is entered to the product input box 22c to search for a software product called "LMN Designer", a list of all software product names including the character string "LMN" will be displayed as search results. Such product names may, for example, be "LMN Data Collector" and "LMN Basic Analysis" besides "LMN Designer".

Two or more character strings or names may be typed in each of the product input box 22c and company name input box 22d. When searching for the above "LMN Designer", for example, the user may type two character strings "LMN" and "Designer" in the product input box 22c, and click the AND button 22i of logic select buttons 22e. Then, "LMN Designer" will be displayed as a software product matching "LMN" and "Designer". When searching for "LMN Designer" and "IJKTM", the user may type two character strings "LMN" and "TM" in the product input box 22c. and clicks the OR button 22j of logic select buttons 22e. Then, "LMN Designer", "LMN Data Collector", "LMN Basic Analysis" and "IJKTM" will be listed as search results, as software products matching "LMN" or "TM". When entering two or more character strings or names, at least one blank space must be inserted between the strings or names by using the space key on the keyboard 7, for example.

(Step S3) Determine Search

After entering the above search information, the user determines whether a search is to be carried out or not. That is, instead of making a search on the above search information, the user may decide to enter different search information. In that case, the user clicks on the reset button 22h to reset the search information, and the operation returns to step S2 (for entering search information). Clicking on the reset button 22h then reinstates the screen in the default state (i.e. reset state) shown in FIG. 8. When making a search, the operation jumps to step S4 (for determining a search based on search information).

(Step S4) Determine Search Based on Search Information

After determining that a search is to be made, the user decides whether the search should be based on the above search information or not. That is, the user may wish to retrieve all software products instead of making a search based on the above search information. In this case, the user clicks on the all product display button 22g whereby the operation jumps to step S5 (for displaying a list of search results). Then, a list of search results is displayed regardless of the search information. When making a search based on the search information, the user clicks on the search button 22f whereby the operation jumps to step S5 (for displaying a list of search results). Then, a list of search results matching the search information is displayed. To describe the operation step by step, steps S3 and S4 are made discrete. In practice, when the above search information has been entered at step S2, the user clicks on the search button 22f, all product display button 22g or reset button 22h, whereby the operation moves to step S2 (for entering search information) or step S5 (for displaying a list of search results).

(Step S5) Display a List of Search Results

For displaying a list of search results, the viewing computer 3 and host computer 2 cooperate to search, in the following sequence, the software information stored in the software information memory 12a. Different methods of searching the software information are adopted when a scientific field select button 21 such as the artificial intelligence select button 21a is used, and when information is manually entered to the field input box 22a and category input box 22b without using a scientific field select button 21. These search methods will be described hereinafter with reference to the hierarchical chart of FIG. 7.

Figure 7:
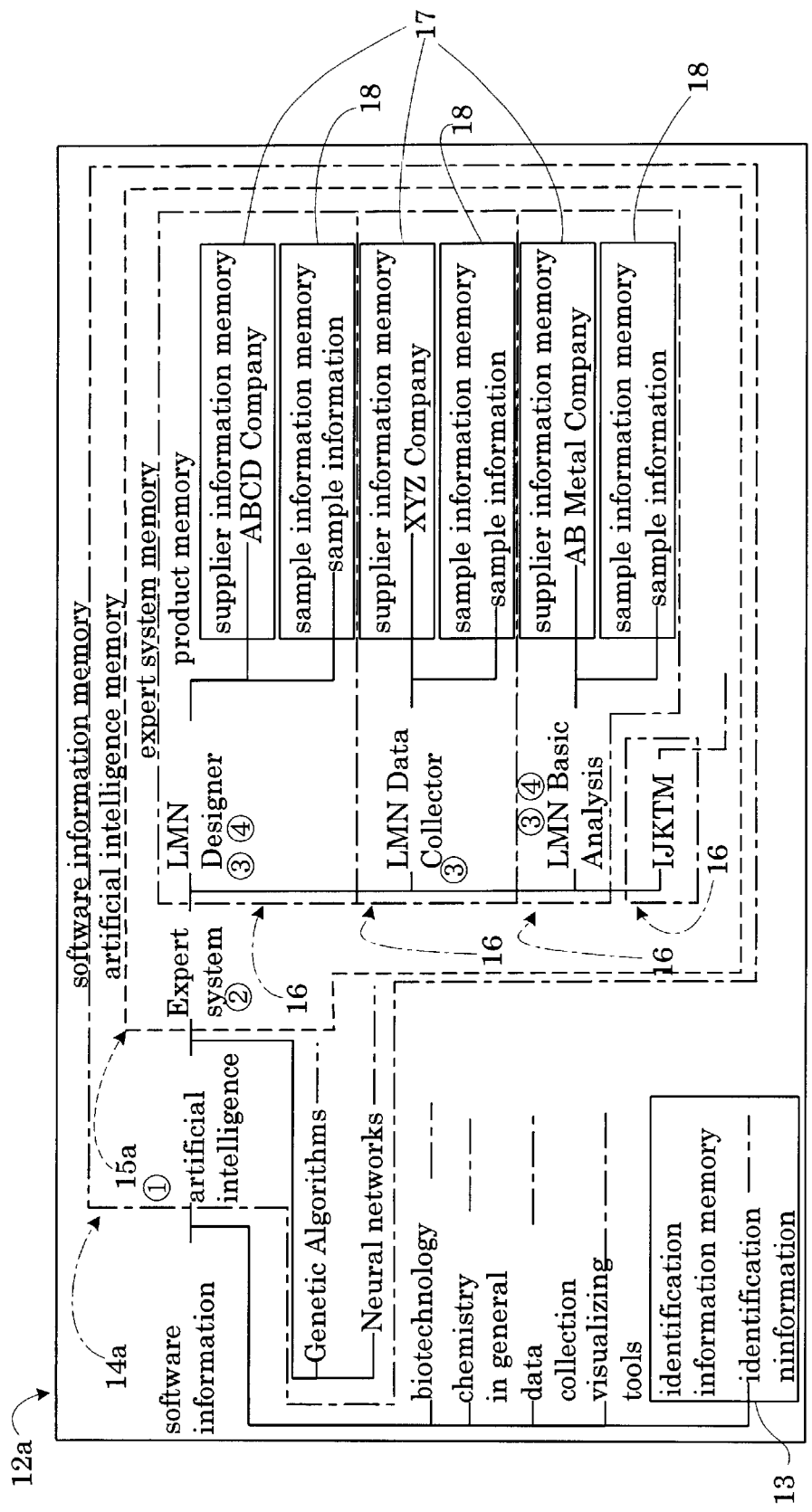
FIG. 7 is a view showing a hierarchical structure of the software information memory.

When a scientific field select button 21 is used, the field searcher 11a specifies a path as far as the field-specified memory 14 (① in FIG. 7). When no scientific field select button 21 is used, the search information manually entered to the field input box 22a is transmitted to the host computer 2 via the control unit 5 and communication line 4, as described in the outset of step S2a (entering field and category) in step S2. Based on the search information transmitted, the field searcher 11a accesses the field-specified memory 14 through the control unit 9 (① in FIG. 7). The contents read from the field-specified memory 14 are applied to the search unit 11 through the control unit 9.

When "Artificial Intelligence" is manually entered to the field input box 22a, for example, "Artificial Intelligence" acting as search information is transmitted to the host computer 2 via the control unit 5 and communication line 4. Based on the search information "Artificial Intelligence" transmitted, the field searcher 11a accesses the field-specified memory 14 through the control unit 9 (① in FIG. 7). Then, "Expert System", "Genetic Algorithms" and "Neural Networks" which are the categories in the artificial intelligence memory 14a are read. "Expert System", "Genetic Algorithms" and "Neural Networks" read are applied to the search unit 11 through the control unit 9. The sequence following this stage is the same whether a scientific field select button 21 is used or not. The subsequent procedure will be described, taking "Expert System" being entered to the category input box 22b for example.

The search information "Expert System" entered to the category input box 22b is transmitted to the host computer 2 via the control unit 5 and communication line 4. At this time, the search information "Expert System" is compared with the categories of artificial intelligence, i.e. "Expert System", "Genetic Algorithms" and "Neural Networks", read at ① in FIG. 7. As noted hereinbefore, a discrepancy could occur between the field manually entered to the field input box 22a and the category manually entered to the category input box 22b. In such a case, the category transmitted as the search information is not included in the categories in the field read at ① in FIG. 7.

Further, based on the search information "Expert System" transmitted, the category searcher 11b accesses the expert system memory 15a in the categorical memory 15 through the control unit 9 (② in FIG. 7). Information on each software product is read from the expert system memory 15a. The information on each software product read is applied to the search unit 11 through the control unit 9.

The character string of a software product entered to the product input box 22c is transmitted to the host computer 2 via the control unit 5 and communication line 4. At this time, the character string of the software product transmitted as search information is compared with the character strings of software products in the category read at ② in FIG. 7. When the character string of the software product transmitted does not match the character string of any software product in the category read at ② in FIG. 7, an error message such as "Nothing found in the search" is displayed on the software information screen 19, as when a discrepancy occurs between the field and category entered.

Further, based on the character string of the software product transmitted as search information, the product searcher 11c accesses the product memories 16 through the control unit 9 (③ in FIG. 7). When the above character string of the software product is "LMN", for example, the product searcher 11c accesses the product memories 16 for names corresponding to "LMN". That is, as at ③ in FIG. 7, access is made to the product memories 16 for "LMN Designer", "LMN Data Collector" and "LMN Basic Analysis". Information read from all product memories 16 (of the names corresponding to "LMN") is applied to the search unit 11 through the control unit 9.

A company name (or a character string forming part of the company name) entered as search information to the company name input box 22d is transmitted to the host computer 2 via the control unit 5 and communication line 4. At this time, the company name transmitted as search information is compared with company names stored in the supplier information memories 17 in all of the product memories 16 (for the names corresponding to "LMN") read at ③ in FIG. 7. When the company name (or the character string forming part of the company name) transmitted does not match any one of the company names (or character strings forming part thereof) read at ③ in FIG. 7, an error message such as "Nothing found in the search" is displayed on the software information screen 19, as when a discrepancy occurs between the field and category entered or between the category and product entered.

Further, based on the company name (or the character string forming part of the company name) transmitted as search information, the keyword searcher 11d accesses, through the control unit 9, only those product memories 16 corresponding to the company name (or the character string forming part of the company name) transmitted as search information, among all the product memories 16 for the names corresponding to "LMN" (at ④ in FIG. 7). When, for example, a character string "AB" forming part of a company name is entered as search information to the company name input box 22d, the keyword search 11d determines, as shown in FIG. 7, whether company names including the character string "AB" are included in the company names stored in the supplier information memories 17 or not. This renders a further limitation in the scope of search results.

As shown in FIG. 7, the company name stored in the supplier information memory 17 in the product memory 16 named "LMN Designer" is "ABCD Company". The company name stored in the supplier information memory 17 in the product memory 16 named "LMN Data Collector" is "XYZ Company". The company name stored in the supplier information memory 17 in the product memory 16 named "LMN Basic Analysis" is "AB Metal Company".

In the case noted above, the companies including the character string "AB" are "ABCD Company" stored in the supplier information memory 17 in the product memory 16 named "LMN Designer" and "AB Metal Company" stored in the supplier information memory 17 in the product memory 16 named "LMN Basic Analysis". "XYZ Company" stored in the supplier information memory 17 in the product memory 16 named "LMN Data Collector" is not applicable. The product memory 16 named "LMN Data Collector" with "XYZ Company" stored in the supplier information memory 17 is excluded. "LMN Designer" and "LMN Basic Analysis" remain (④ in FIG. 7).

Figure 10:
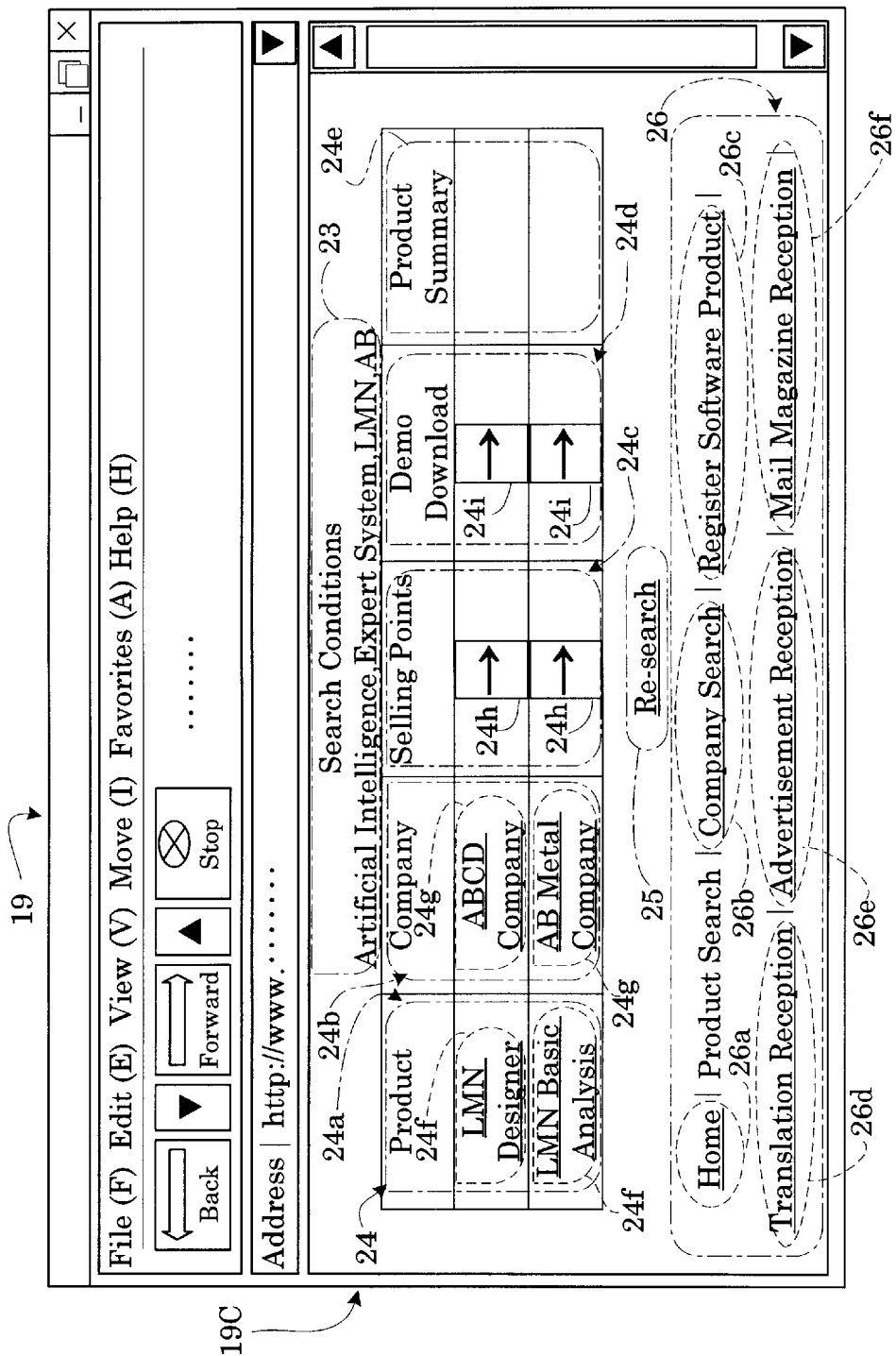
FIG. 10 is a view showing a software information search result screen listing search results based on search information inputted.

The information limited to "LMN Designer" and "LMN Basic Analysis" is transmitted to the viewing computer 3 via the control unit 9 and communication line 4. The information is further transmitted via the control unit 5 to the software information screen 19 of screen display unit 6. Then, a list of search results is displayed in the form of a software information search result screen 19C as shown in FIG. 10.

That is, by clicking the search button 22f or all product display button 22g, the software information search result screen 19C is displayed on the software information screen 19. The software information search result screen 19C includes a search condition display 23 in an upper column thereof, a search result listing display 24 in an upper middle column, a search reset button 25 in a lower middle position, and jump buttons 26 in a lower column.

The search condition display 23 states the search conditions entered as the search information on the software information search screen 19B in FIG. 8. These conditions include the information entered to the field input box 22a, category input box 22b, product input box 22c and company name input box 22d. When, for example, "Artificial Intelligence" is entered to the field input box 22a, "Expert System" to the category input box 22b, "LMN" to the product input box 22c, and "AB" (character string) to the company name input box 22d, the search condition display 23 states "Artificial Intelligence", "Expert System", "LMN" and "AB". As noted hereinbefore, a search may be carried out by entering information to at least the field input box 22a and category input box 22b, instead of entering information to all the input boxes 22, i.e. the field input box 22a, category input box 22b, product input box 22c and company name input box 22d. Thus, the search condition display 23 may state only a field and a category.

The search result listing display 24 includes a product name column 24a in a left end position thereof for stating the product names read at ④ in FIG. 7, a company name column 24b in a middle left position for stating the company names stored in the supplier information memories 17, a selling point column 24c in a middle position with selling point buttons 24h for viewing selling points describing the features of the software products, a demonstration download column 24d in a middle right position with demonstration download buttons 24i for demonstration downloading, and a product summary column 24e in a right end position for stating summaries of the products.

Each product in the product name column 24a has a product display button 24f for displaying a screen giving a detailed description of the product. Each line stating a product in the company name column 24b has a homepage access button 24g for accessing the home page of the company.

The search result listing display 24 takes the form shown in FIG. 10 when displaying "LMN Designer" offered by "ABCD Company" and "LMN Basic Analysis" offered by "AB Metal Company" as search results. That is, the product name column 24a displays "LMN Designer" and "LMN Basic Analysis" as shown in FIG. 10. The company name column 24b displays "ABCD Company" on the line of "LMN Designer", and "AB Metal Company" on the line of "LMN Basic Analysis".

Figure 11:
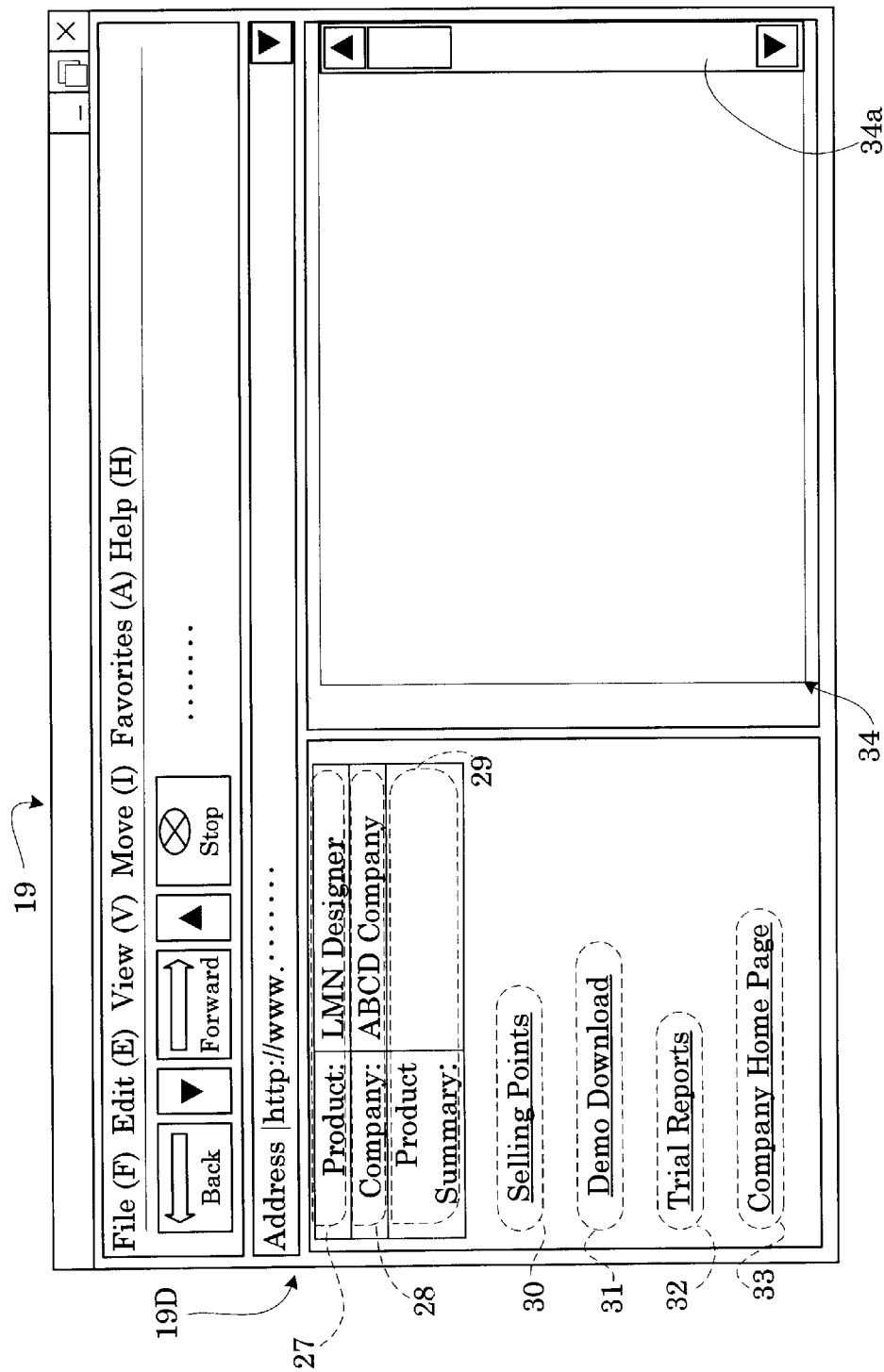
FIG. 11 is a view showing a product description screen presenting a detailed description of a software product.

When the user clicks on the product display button 24f on the line of "LMN Designer", a product description screen 19D giving a detailed description of "LMN Designer" is displayed as shown in FIG. 11. When the user clicks on the homepage access button 24g on the line of "LMN Designer", access is made to the home page (URL) of "ABCD Company" having registered the product "LMN Designer". This is applicable also to "LMN Basic Analysis".

When the user clicks on the selling point button 24h on the line of "LMN Designer", a screen describing the selling points of "LMN Designer" is displayed. When the user clicks on the demonstration download button 24i on the line of "LMN Designer", a demonstration version of "LMN Designer" may be downloaded (strictly speaking, access (link) is made to an URL for demonstration downloading, and a demonstration version may be downloaded from the URL). The product summary column 24e gives a summary of "LMN Designer" on the line of "LMN Designer". This is applicable also to "LMN Basic Analysis".

The search reset button 25 shown in FIG. 10 has a function to return to the software information search screen 19B and allow search information to be re-entered for searching software information.

The jump buttons 26 have a function, when clicked on, to jump to the screens the user wishes to view. Specifically, the jump buttons 26 include a top page jump button 26a for returning to the top page screen 19A, a company search screen jump button 26b for jumping to a screen for searching companies having registered software products (offering software information), and a registration screen jump button 26c for jumping to a screen for registering software products. The jump buttons 26 further include a translation reception screen jump button 26d for jumping to a screen for accepting requests for translation, an advertisement reception screen jump button 26e for jumping to a screen for accepting advertisements, and a mail magazine reception screen jump button 26f for jumping to a screen for accepting mail magazine purchases.

When a product display button 24f is clicked as described above, a product description screen 19D giving a detailed description of a corresponding software product is displayed as shown in FIG. 11.

The product description screen 19D includes, in an upper left portion thereof, a product name column 27 stating the product name, a company name column 28 stating the company name, and a product summary column 29 stating a summary of the software product. The product name column 27 shows the same name shown in the product name column 24a displayed in the left end position of search result listing display 24 on the software information search result screen 19C. The company name column 28 shows the same name shown in the company name column 24b displayed in the middle left position of search result listing display 24 on the software information search result screen 19C. Similarly, the product summary column 29 shows the same summary shown in the product summary column 24e in the right end position of search result listing display 24 on the software information search result screen 19C.

The user may click on the product display button 24f of "LMN Designer" shown in FIG. 10, for example. Then, as shown in FIG. 11, the product name column 27 displays "LMN Designer", the company name column 28 displays "ABCD Company" having registered the product "LMN Designer", and the product summary column 29 displays the summary of "LMN Designer".

The product description screen 19D includes, in a lower left column, a selling point button 30 for viewing selling points indicating features of the software product, a demonstration download button 31 for demonstration downloading, a trial report button 32 for viewing trial reports given by users and for the users to input trial reports as described hereinafter, and a homepage access button 33 for accessing the home page. The selling points may be viewed by clicking on the selling point button 30 in the lower left column of product description screen 19D, or the selling point button 24h provided in the middle position of search result listing display 24 on the software information search result screen 19C. Demonstration downloading may be carried out by clicking on the demonstration download button 31 in the lower left column of product description screen 19D or the demonstration download button 24i provided in the middle right position of search result listing display 24 on the software information search result screen 19C. Similarly, the home page of the company may be accessed by clicking on the homepage access button 33 in the lower left column of product description screen 19D or the homepage access button 24g provided in the middle left position of software information search result screen 19C.

The product description screen 19D includes a catalog screen 34 for giving a detailed description (or a catalog). A catalog too long to be contained on one page may be divided into a plurality of pages, or may be displayed by clicking on a scrollbar 34a to scroll the catalog screen 34 up and down. Besides the above catalog, what may be displayed includes a screen for demonstration downloading (demonstration down-loading site), trial reports, and the home page of the company having provided the catalog (i.e. software information).

Though not shown, the product description screen 19D further includes a top page jump button for returning to the top page screen 19A, and a company search screen jump button for jumping to the screen for searching companies.

Thus, the software information is read and displayed as search results as shown in FIGS. 10 and 11. That is, the software information stored in the software information memory 12a in the host computer 2 is read by the search unit 11, transmitted via the communication line 4, the control unit 9 in the host computer 2 and the control unit 5 in the viewing computer 3, and displayed on the screen display unit 6 (software information screen 19) of the viewing computer 3.

The demonstration downloading, trial reports, selling points and product summary shown in FIGS. 10 and 11 are displayed on the screen display unit 6 (software information screen 19) of the viewing computer 3. These displays are based on sample information read by the search unit 11 from the sample information memory 18 in the software information memory 12a. The company name and the like shown in FIGS. 10 and 11 are displayed on the screen display unit 6 (software information screen 19) of the viewing computer 3, based on supplier information read by the search unit 11 from the supplier information memory 17 in the software information memory 12a.

The software information is hierarchized by field, category and software product. That is, as shown in FIG. 2, the software information memory 12a has a hierarchy of field-specified memories 14, categorical memories 15 and product memories 16. Consequently, by clicking on one of the scientific field select button 21 or entering information to each input box 22 on the software information search screen 19B on the viewing computer 3 shown in FIGS. 8 and 9, the software information is searched in the hierarchical order by the field searcher 11a, category searcher 11b, product searcher 11c and keyword searcher 11d in the search unit 11 to be displayed by the screen display unit 6 of viewing computer 3. With the above hierarchical arrangement, the software information may be displayed immediately to realize an efficient viewing thereof.

Further, since the software information memory 12a includes also the sample information memory 18, the user can view the sample information such as the demonstration downloading, selling points and product summary shown FIGS. 10 and 11. Moreover, the user can immediately determine, only by viewing the sample information, whether the software product is necessary to the user or not.

Figure 12:
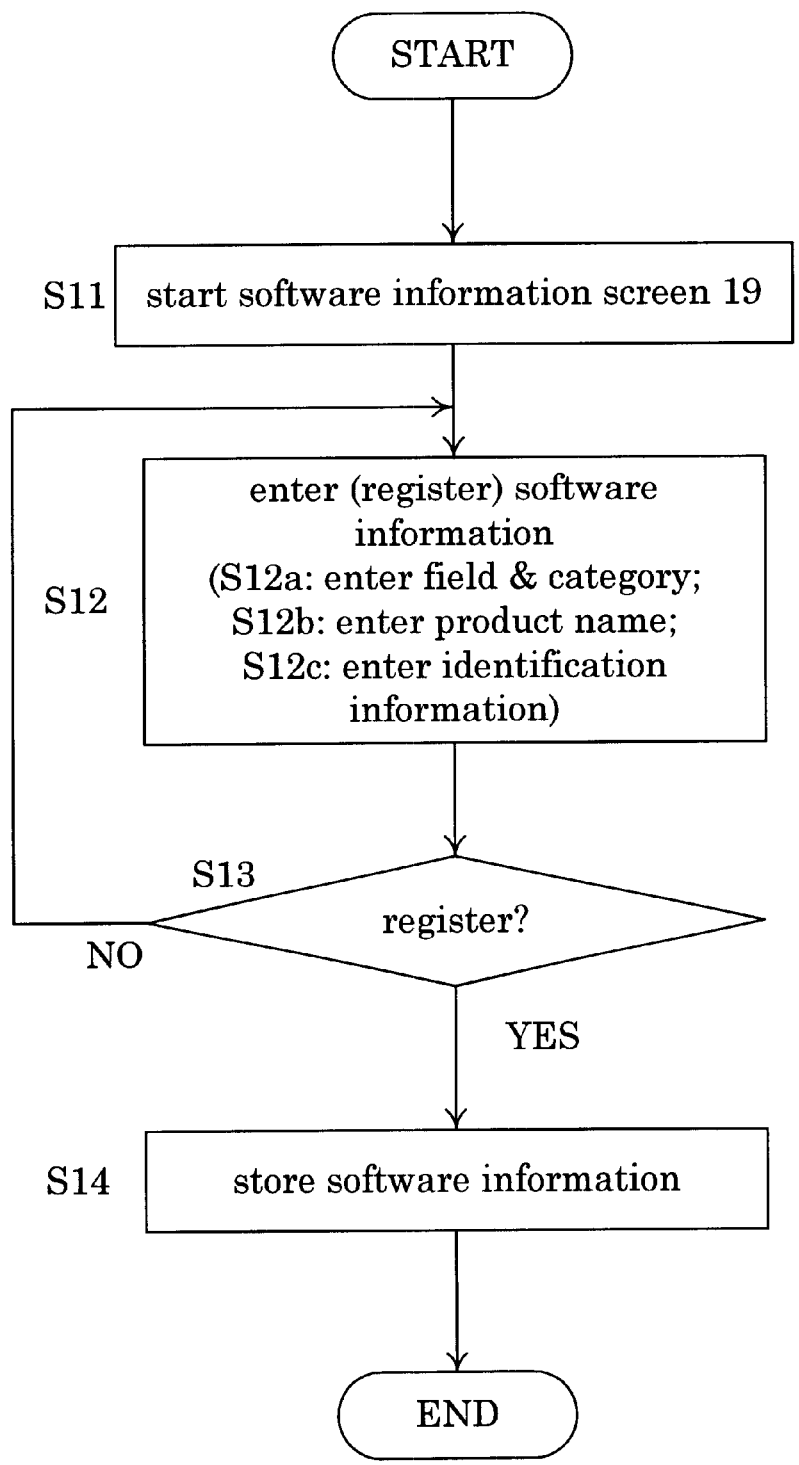
FIG. 12 is a flow chart of a sequence from startup of the software information screen to registration of a software product.

A company offering software information starts the software information screen 19 on the uploading computer 1 to upload the software information to the host computer 2 (i.e. register a software product). This procedure will be described with reference to the software information screens shown in FIGS. 5 and 14, the flow chart of FIG. 12 and the hierarchical chart of FIG. 13.

(Step S11) Start Software Information Screen 19

Figure 14:
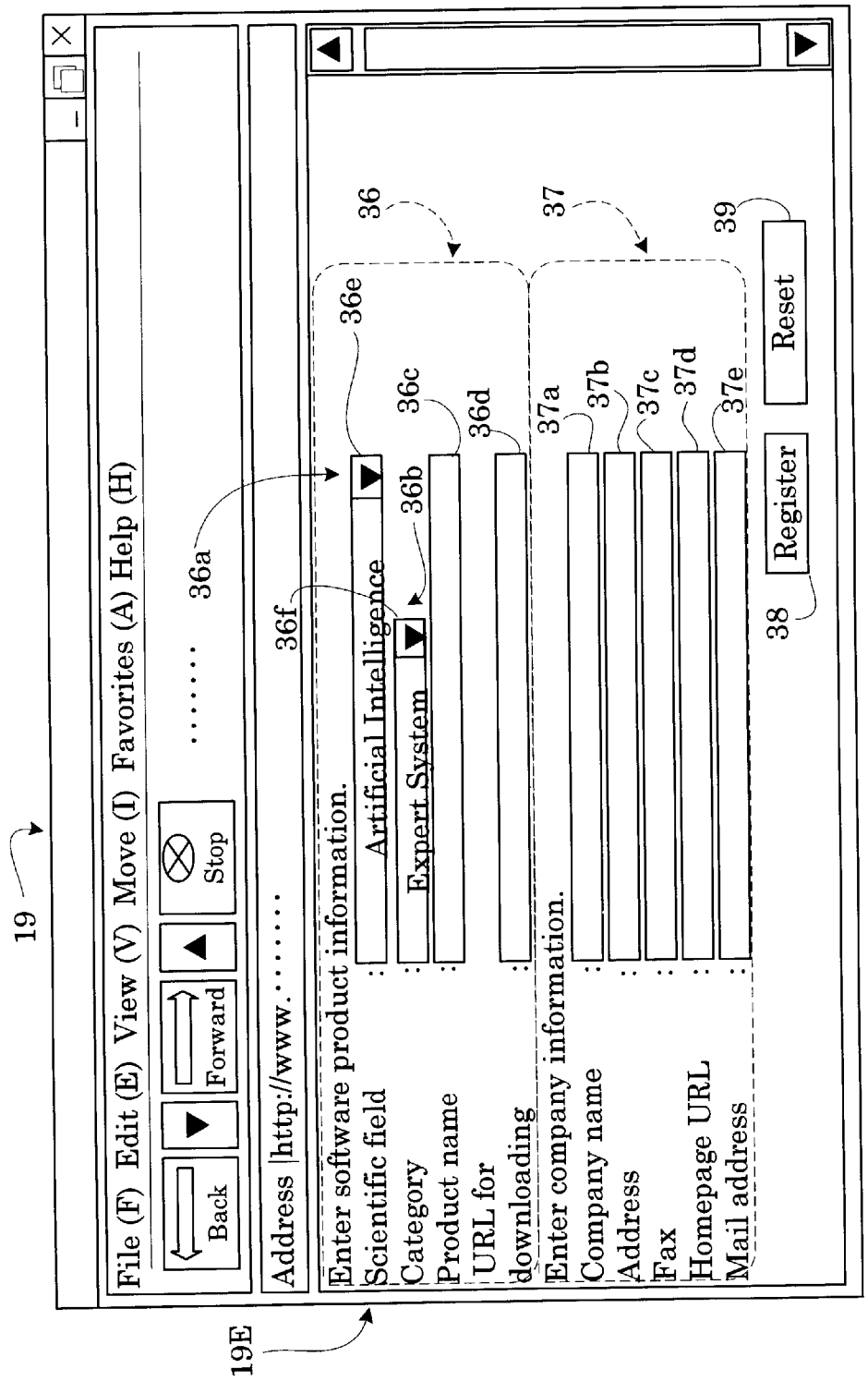
FIG. 14 is a view showing a software information upload screen for uploading software information.

The company offering the software information starts the software information screen 19 on the uploading computer 1 through the screen display unit 6. The software information screen 19 shown in FIG. 5 is displayed on the monitor of uploading computer 1. Upon startup, as shown in FIG. 5, the top page screen 19A appears on the software information screen 19 as in time of software information search. When uploading software information, the user clicks on a software product register button 35 on the top page screen 19A as shown in FIG. 5. Then, a link is made to a software information upload screen 19E as shown in FIG. 14.

(Step S12) Enter (register) Software Information

The software information upload screen 19E has input boxes 36 arranged in an upper column thereof for entering software information. The input boxes 36 include a field input box 36a for entering a scientific field, a category input box 36b for entering a category, a product input box 36c for entering the name of a software product, and a demonstration download URL input box 36d for entering an URL to be accessed for demonstration downloading. The field input box 36a and category input box 36b are in the pull-down form to be superimposed on the software information upload screen 19E.

Further, the software information upload screen 19E has input boxes 37 arranged in a lower column thereof for entering supplier information. The input boxes 37 include a company name input box 37a for entering a company name, an address input box 37b for entering the address of the company, a fax input box 37c for entering the fax number of the company, a homepage URL input box 37d for entering an URL to be accessed for looking at the company's home page, and a mail address input box 37e for entering a mail address (e.g. an e-mail address).

Under the input boxes 37 are a register button 38 for registering the software information entered to the input boxes 36 and input boxes 37, and a reset button 39 for resetting the software information entered to the input boxes 36 and input boxes 37.

The system in this embodiment provides the input boxes 37 such as the company name input box 37a, address input box 37b and so on for entering company information. Input boxes may also be provided for entering supplier information, that allows individual persons interested in science to register their software products and software information.

In the system in this embodiment, the field input box 36a and category input box 36b are in the pull-down form. A field or category is entered by selecting one of fields or categories included in a pull-down menu superimposed on the software information upload screen 19E. The system may be modified to allow a field and a category to be manually entered to the field input box 36a and category input box 36b. In the case of manual entry, however, varied names could be chosen for the same scientific field or category by speculations or the like on the part of suppliers. Conversely, the same name may be entered for different scientific fields or categories. Such irregularities will hamper an operation to hierarchize the software information as described hereinafter. It is thus preferable to standardize the field and category by the above pull-down mode.

When a link is made to the software information upload screen 19E, as shown in FIG. 14, "Artificial Intelligence" has already been entered to the field input box 36a, and "Expert System" to the category input box 36b, both as defaults. However, the system may of course be adapted to show these boxes blank when a link is made to the software information upload screen 19E.

Figure 13:
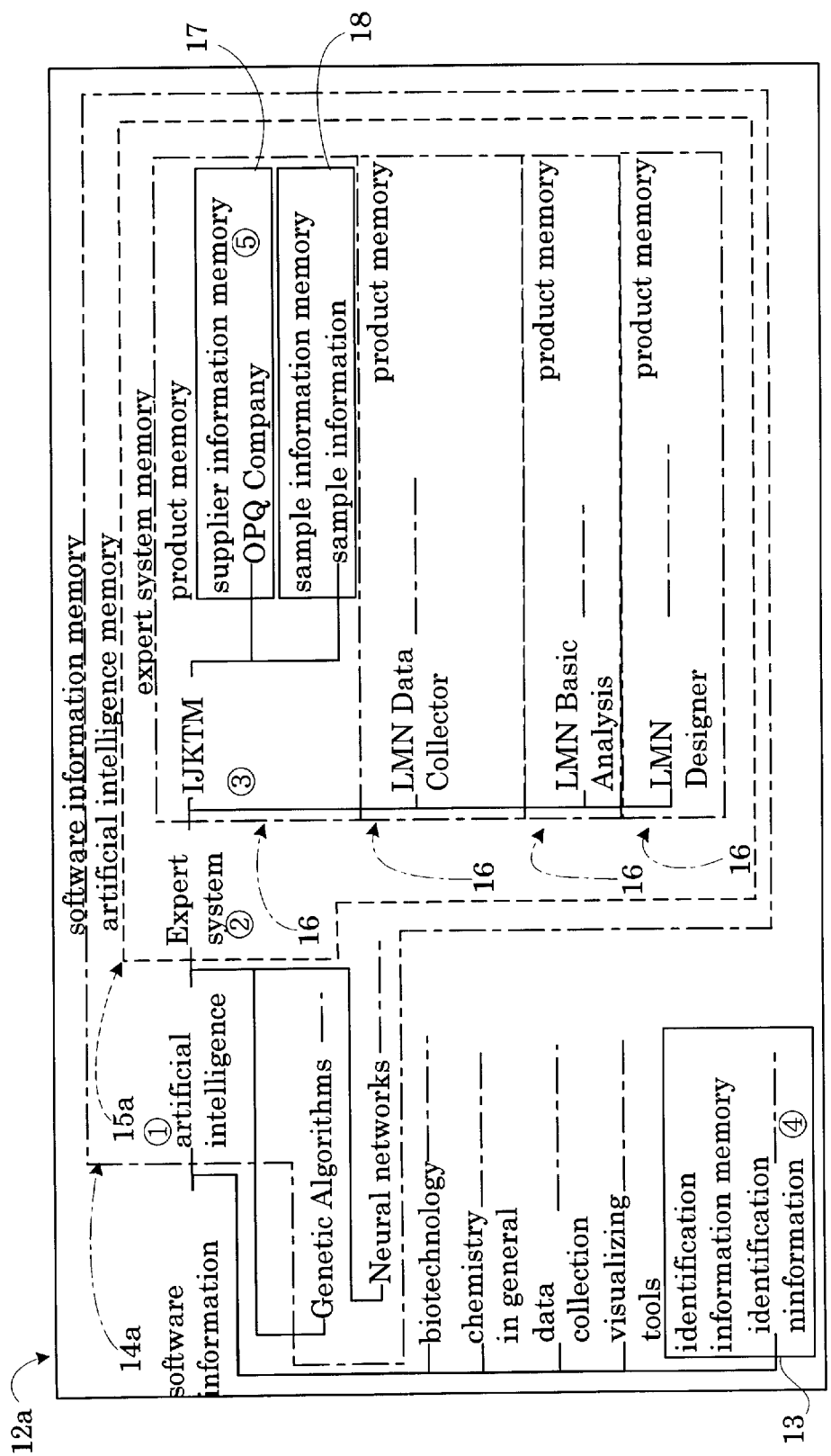
FIG. 13 is a view showing a hierarchical structure of the software information memory.

A method of entering (registering) software information will be described next with reference to the hierarchical chart of FIG. 13. It is assumed here that "Artificial Intelligence" is entered to the field input box 36a and "Expert System" to the category input box 36b.

(Step S12a) Enter Field and Category

First, as shown in FIG. 14, the user clicks on a pull-down button 36e to the right of field input box 36a. Then, a pull-down menu, not shown, is displayed in superimposition to allow the user to select a field from the pull-down menu. In this case, the user clicks on "Artificial Intelligence" included in the pull-down menu, whereby the field "Artificial Intelligence" is selected and entered to the field input box 36a. Similarly, when the user clicks on a pull-down button 36f to the right of category input box 36b, a pull-down menu, not shown, appears in superimposition to allow the user to select a field therefrom. In this case, the user clicks on "Expert System" included in the pull-down menu, whereby the category "Expert System" is selected and entered to the category input box 36b.

The category input box 36b is interlocked to the field input box 36a. The categories listed in the pull-down menu of category input box 36b are variable with the field entered to the field input box 36a, That is, when "Artificial Intelligence" is entered to the field input box 36a as noted above, "Expert System", "Genetic Algorithms" and "Neural Networks which are the categories of "Artificial Intelligence" are taken into the pull-down menu of category input box 36b.

Specifically, "Artificial Intelligence" entered to the field input box 36a is transmitted to the host computer 2 via the control unit 5 and communication line 4. Based on the software information "Artificial Intelligence" transmitted, the field hierarchizer 10a accesses the field-specified memory 14 through the control unit 9 (① in FIG. 13). Since "Artificial Intelligence" is entered in this case, the field hierarchizer 10a accesses the artificial intelligence memory 14a, and reads therefrom "Expert System", "Genetic Algorithms" and "Neural Networks which are the categories of "Artificial Intelligence". These categories read are transmitted to the uploading computer 1 via the control unit 9 and communication line 4, and further through the control unit 5 to be displayed in the pull-down menu of category input box 36b on the software information upload screen 19E.

When "Expert System" is selected and entered to the category input box 36b, this information is transmitted to the host computer 2 through the control unit 5 and communication line 4. Based on the software information "Expert System" transmitted, the category hierarchizer 10b, through the control unit 9, accesses the expert system memory 15a which is one of the categorical memories 15 (② in FIG. 13).

(Step S12b) Enter Product Name

A product name is entered after the field and category are entered as described above. When entering a product name, the user clicks the mouse 8 with its pointing device touching the product input box 36c. and operates the keyboard 7 manually and directly to enter a software product to be registered to the product input box 36c. As distinct from the case of a search, the product name must be entered in full. When entering a software product "IJKTM", for example, the entire character string "IJKTM" is entered to the product input box 36c. When entering the company name also, which will be described hereinafter, as when entering the product name, the entire character string forming the company name must be entered.

(Step S12c) Enter Identification Information

The entry of the product name noted above is followed by an entry of company identification information including the URL for demonstration downloading, company name, company address, fax number, homepage URL and e-mail address. When entering the above identification information, the user clicks the mouse 8 with its pointing device touching the demonstration download URL input box 36b, company name input box 37a, address input box 37b, fax input box 37c, homepage URL input box 37d and mail address input box 37e, and operates the keyboard 7 to enter the identification information to each box manually and directly.

(Step S13) Determine Registration of Software Information

After entering the above identification information, the user determines whether or not to register the software information including the above identification information, i.e. the software information entered to input boxes 36 and input box 37. When resetting the software information without registering it, the user clicks on the reset button 39, and the operation returns to step S12 (for entering software information). When registering the software information, the user clicks on the register button 38, and the operation jumps to step S14 (for storing software information).

(step S14) Storing Software Information

When a desired field and category are entered to the field input box 36a and category input box 36b (at step S12a (entering field and category)), access is made down to the categorical memory 15 (② in FIG. 13) as noted hereinbefore. When "IJKTM" is entered to the product input box 36c, for example, the software information "IJKTM" is transmitted to the host computer 2 via the control unit 5 and communication line 4. Based on the software information "IJKTM" transmitted, the product hierarchizer 10c accesses, through the control unit 9, the expert system memory 15a which is one of the categorical memories 15, and creates a product memory 16 named "IJKTM" in the expert system memory 15a (③ in FIG. 13). That is, the software information entered to the product input box 36c results in a new product memory 16 created in the categorical memory 15 within the software information memory 12a. Thus, the software information entered is stored as hierarchized in the software information memory 12a.

While the system in this embodiment provides the register button 38 and reset button 39 on the software information upload screen 19E, a change button (not shown) may also be provided for changing the software information already registered. In this case, a change will result in the existing product memory 16 being overwritten, instead of creating a new product memory 16 in the categorical memory 15.

Further, the identification information entered to the demonstration download URL input box 36b, company name input box 37a, address input box 37b, fax input box 37c, homepage URL input box 37d and mail address input box 37e is transmitted to the host computer 2 via the control unit 5 and communication line 4. The identification information is written to the identification information memory 13a by the control unit 9 (④ in FIG. 13).

The company name entered to the company name input box 37a is written not only to the identification information memory 13a but to a supplier information memory 17 newly created in the product memory 16. Specifically, the company name entered to the company name input box 37a is transmitted to the host computer 2 via the control unit 5 and communication line 4. Based on the company name transmitted, the product hierarchizer 10c accesses, through the control unit 9, the supplier information memory 17 newly created in the product memory 16, and writes the company name to the supplier information memory 17 (⑤ in FIG. 13). When the company supplying "IJKTM" is "OPQ company", for example, "OPQ company" is entered to the company name input box 37a. and the name "OPQ company" is written to the supplier information memory 17 in the product memory 16 named "IJKTM" (⑤ in FIG. 13).

When the above information registering operation is completed, a link is made to a sample information registering screen, not shown, for entering sample information such as selling points indicating features of the software product and a product summary. Such sample information is transmitted to the host computer 2 via the control unit 5 and communication line 4. Based on the sample information transmitted, the product hierarchizer 10c accesses, through the control unit 9, a sample information memory 18 newly created in the product memory 16, and writes the information to the sample information memory 18.

Results of the registration may be displayed on the screen of uploading computer 1 for confirmation purposes. To prevent a false registration by mischief or the like, the software information memory 12a may include a memory for provisional registration (not shown) for storing software information in a hierarchized state immediately after registration. A confirmation message may be returned to the supplier at the mail address registered. Subsequently, the software information may be transferred from the memory for provisional registration to the software information memory 12a as a fully accepted registration.

The software information entered (registered) by the supplier is hierarchized by the three levels of field, category and software product by the hierarchizing unit 10 and software information memory 12a acting as the storage device. The software information hierarchized as above is stored in the software information memory 12a of the host computer 2. That is, when appropriate inputs are made to input boxes 36 and input boxes 37 on the software information upload screen 19E on the uploading computer 1 shown in FIG. 14, the software information is hierarchized in the hierarchical order (including creation of new memories) by the field hierarchizer 10a, category hierarchizer 10b and product hierarchizer 10c included in the hierarchizing unit 10, to be stored in the software information memory 12a.

The system in this embodiment serves not only software information (or registers software products), but also scientific information such as on academic societies, exhibitions and advertisements stored in the academic society and exhibition information memory 12b and advertisement information memory 12c. Such scientific information has been transferred from the uploading computer 1 to the host computer 2.

Besides searching and registering software information as described above, the system in this embodiment has the following functions:

(1) For example, a search may be made of companies offering software information, requests for translation may be accepted, advertisements may be accepted, mail magazines may be purchased, and information on academic societies and exhibitions may be viewed. As shown in FIG. 5, the top page screen 19A includes, besides the software product search button 20 and software product register button 35, a company search screen jump button 40 for jumping to a screen for searching companies, a translation reception screen jump button 41 for jumping to a screen for accepting requests for translation, an advertisement reception screen jump button 42 for jumping to a screen for accepting advertisements, and a mail magazine reception screen jump button 43 for jumping to a screen for accepting mail magazine purchases. In addition, though not shown, an academic society and exhibition viewing screen jump button is provided for jumping to a screen for viewing information on academic societies and exhibitions, and a trial report reception jump button is provided for jumping to a screen for accepting trial reports from users.

A search of companies and accepting a translation request will be described next. The other functions (accepting advertisements, mail magazine purchase, and viewing information on academic societies and exhibitions, etc.) will not be described, since these functions are performed in a way similar to what will be described hereinafter.

Company Search

Figure 15:
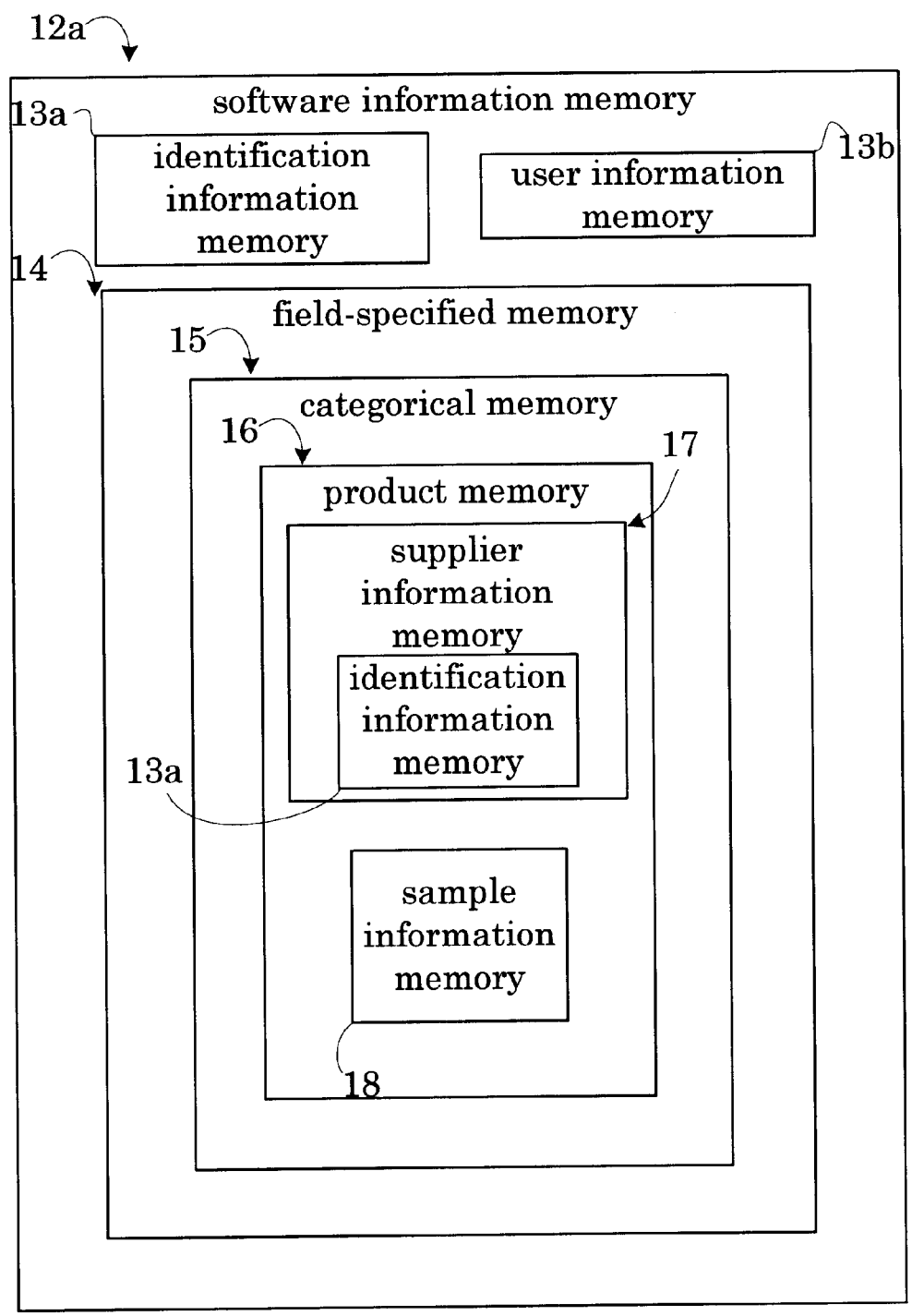
FIG. 15 is a schematic view of a modified software information memory.

A search of companies will be described first. FIG. 15 is a schematic view of a modified software information memory 12a. The software information memory 12a shown in FIG. 15 has such a construction that an identification information memory 13a as shown in FIG. 1 or 2 may be stored also in the supplier information memory 17 shown in FIG. 2. When an identification information memory 13a is newly created, its contents are automatically written to the identification information memory 13a stored in the supplier information memory 17.

Figure 16:
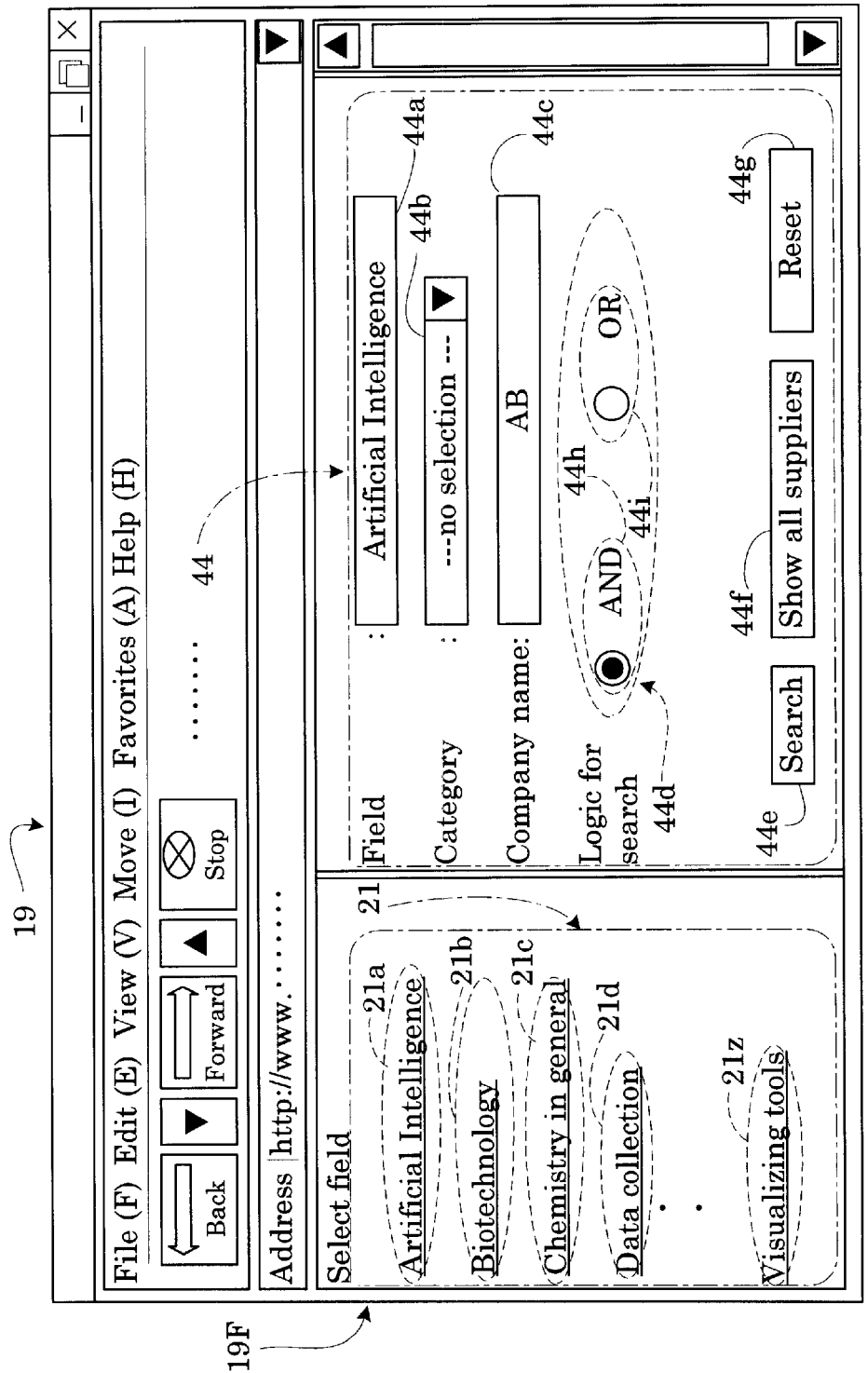
FIG. 16 is a view showing a company search screen for inputting information for searching companies.

When the user clicks on the company search screen jump button 40 on the top page screen 19A, a link is made to a company search screen 19F as shown in FIG. 16. As does the software information search screen 19B used in searching and viewing software information (see FIG. 8), the company search screen 19F has various scientific field select buttons 21 arranged in a left column thereof for selecting scientific fields. These scientific field select buttons are the same as in FIG. 8, and are affixed with like references.

Further, the company search screen 19F has input boxes 44 arranged in a right column for entering search information for searching companies. The input boxes 44 include a field input box 44a for entering search information on scientific fields, a category input box 44b of the pull-down type for inputting search information on categories, a company name input box 44c for inputting company names, logic select buttons 44d for selecting whether a search based on the key word inputted to each box should be carried out by "AND" or "OR" function, a search button 44e for executing a search based on the above search information, an all company display button 44f for searching and displaying all companies regardless of the field, category, software product and key word, and a reset button 44g for resetting the above search information.

The input boxes 44 are approximately the same as the input boxes 22 on the software information search screen 19B. A company search may produce no result when the number of candidates for search conditions is too small. Thus, "no selection" may be selected for the category input box 44b as shown in FIG. 16, instead of selecting only one category from the pull-down menu of category input box 44b. The term "no selection" herein indicates searching all the categories. When "Artificial intelligence" is selected for the field input box 44a and "no selection" for the category input box 44b, all the categories in "Artificial intelligence" are selected and searched.

When the user clicks on the search button 44e after entering the above search information, data is exchanged between the viewing computer 3 and host computer 2 as when searching and viewing software information. This aspect will be described with reference to the schematic view shown in FIG. 15.

Upon entry of the above search information, the search unit 11 searches the fields, categories and software products in the hierarchical order. That is, the field searcher 11a accesses the field-specified memory 14, and the category searcher 11b accesses the categorical memory 15. The keyword searcher 11d accesses the identification information memory 13a in the categorical memory 15 identified.

Figure 17:
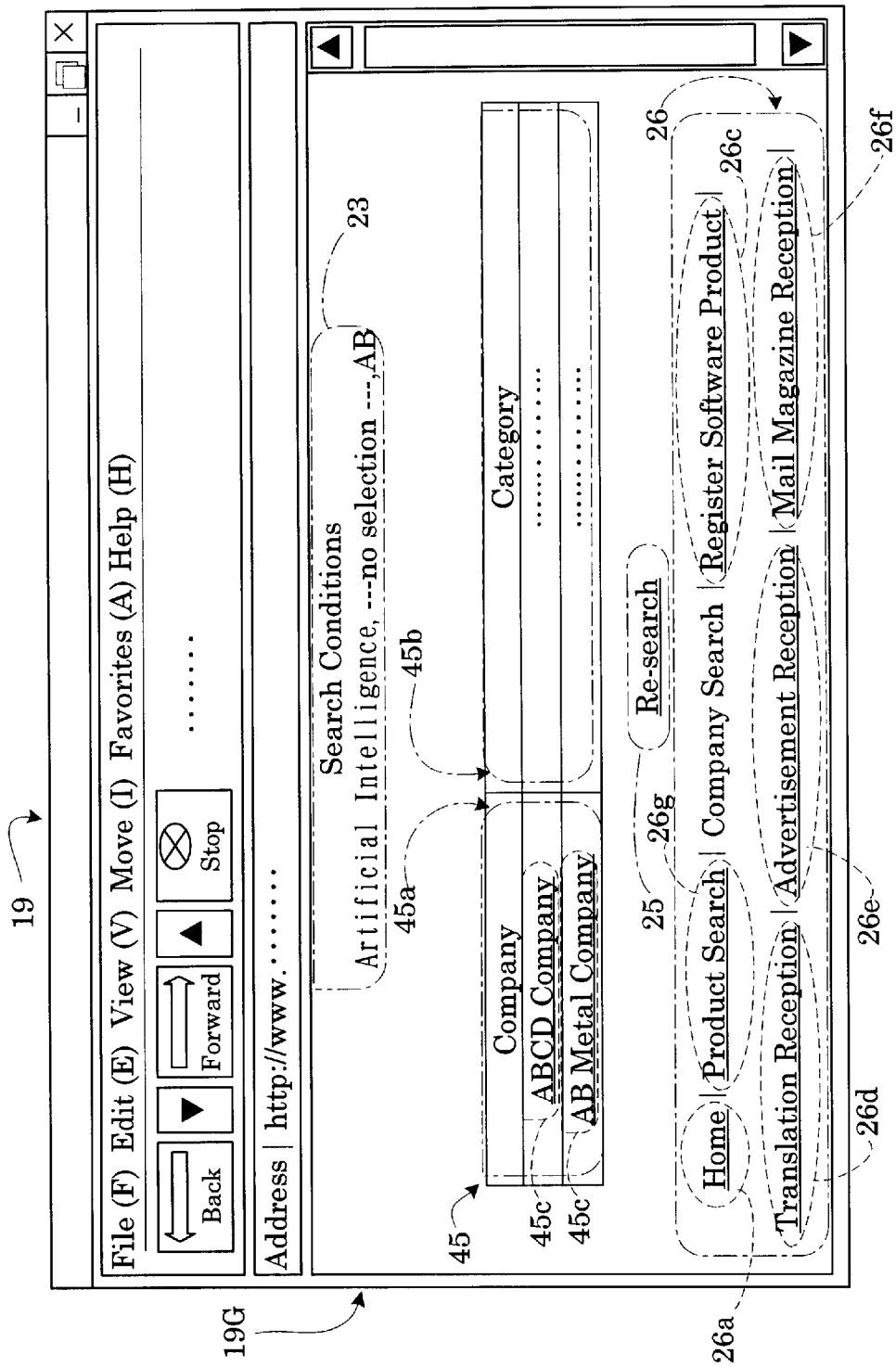
FIG. 17 is a view showing a company search result screen listing search results based on search information inputted.

On the screen, a company search result screen 19G as shown in FIG. 17 is displayed as a list of companies retrieved by clicking on the search button 44e.

As does the software information search result screen 19C (see FIG. 10) for viewing the results of a software information search, the company search result screen 19G includes a search condition display 23 in an upper column thereof, a search reset button 25 in a lower middle position, and jump buttons 26 in a lower column. Further, the company search result screen 19G includes a search result listing display 45 in an upper middle column thereof. The search condition display 23, search reset button 25 and jump buttons 26 are the same as in FIG. 10, and are affixed with like references.

When the user is viewing the results of a software information search, the screen for searching software information (i.e. the software information search screen 19B) may be reinstated immediately by clicking on the search reset button 25 shown in FIG. 10. However, in time of searching companies as shown in FIG. 17, it is impossible to return directly from the company search screen 19F to the software information search screen 19B. Thus, a product search screen jump button 26g is added to the jump buttons 26.

The search result listing display 45 includes a company name column 45a disposed in a left portion thereof for listing company names as search results, and category column 45b in a right portion for listing categories belonging to the identification information memory 13a searched. Each company listed in the company name column 45a has an identification information display button 45c for displaying a screen showing identification information on the company such as an URL for demonstration downloading, company name, company address, fax number, homepage URL and e-mail address.

As shown in FIG. 16, "Artificial Intelligence" is entered to the field input box 44a, "no selection" to the category input box 44b, "AB" (character string) to the company name input box 44c. Each column of the company search screen 19F will be described in detail, taking for example the case of "ABCD Company" and "AB Metal Company" being displayed in the company name column 45a of search result listing display 45 as shown in FIG. 17. The category column 45b and jump buttons 26 will not particularly be described.

As shown in FIG. 17, the search condition display 23 gives, as search conditions, "Artificial Intelligence", "no selection" and "AB" entered to the input boxes 44. When the user clicks on the identification information display button 45c on the line of "ABCD Company" access may be made to a screen giving identification information on "ABCD Company". This applies also to "AB Metal Company".

Figure 18:
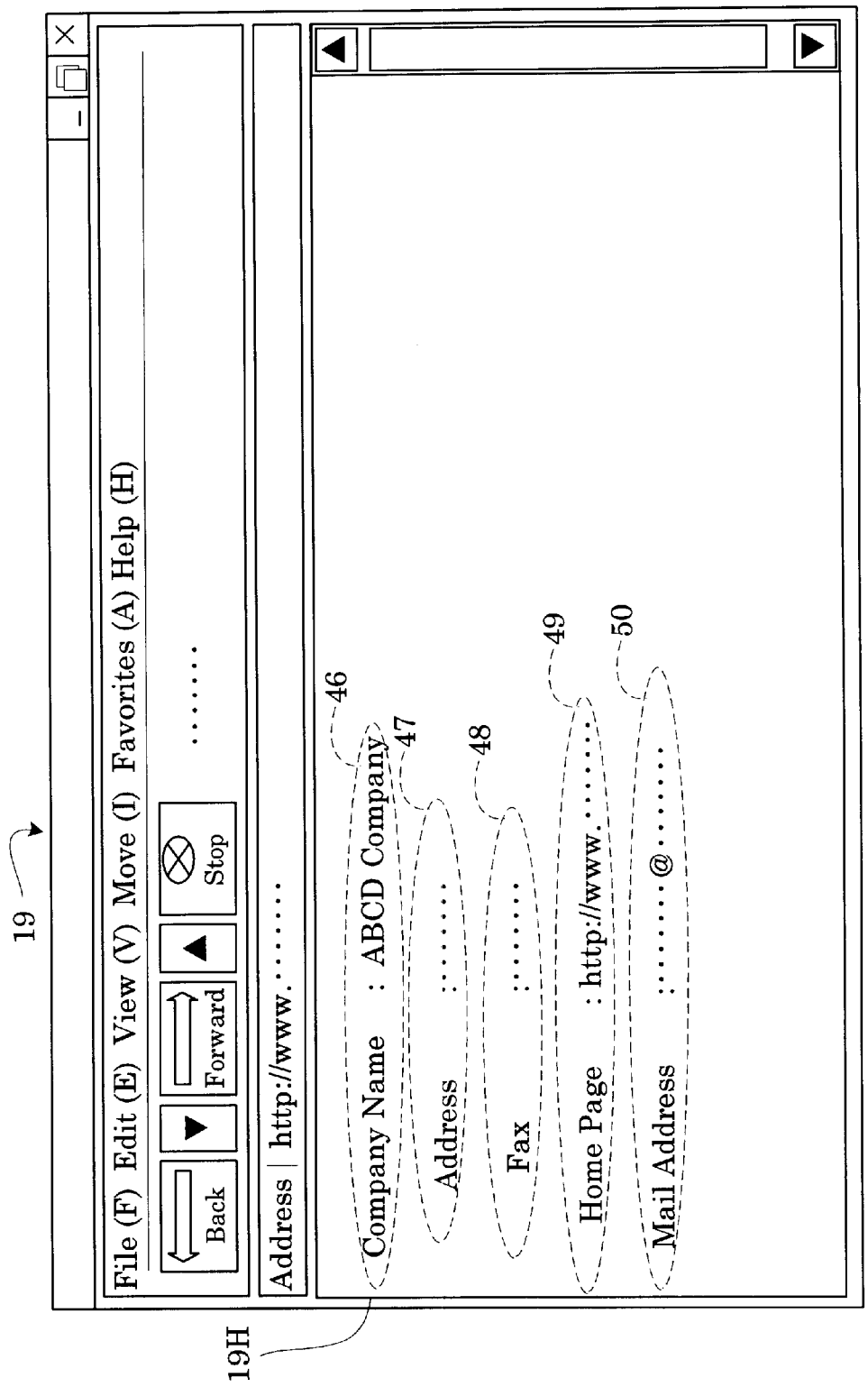
FIG. 18 is a view showing an identification information display screen displaying identification information on a supplier.

When the user clicks on the identification information display button 45c, identification information on the corresponding company is displayed on an identification information display screen 19H as shown in FIG. 18. In the case of "ABCD Company", "ABCD Company" is displayed in a company name box 46 on the identification information display screen 19H. The address of "ABCD Company" is displayed in an address box 47 on the identification information display screen 19H. The fax number of "ABCD Company" is displayed in a fax number box 48 on the identification information display screen 19H. The homepage URL of "ABCD Company" is displayed in a home page box 49 on the identification information display screen 19H. The e-mail address of "ABCD Company" is displayed in a mail address box 50 on the identification information display screen 19H.

When the identification information is entered as search information on the screen display unit 6 (company search screen 19F) of viewing computer 3, the identification information read from the identification information memory 13a is displayed on the identification information display screen 19H. Thus, the user may view the identification information as well as software information with ease. Based on the identification information, a software product may be purchased with ease. The user can buy the software product directly by referring to the identification information.

Figure 19:
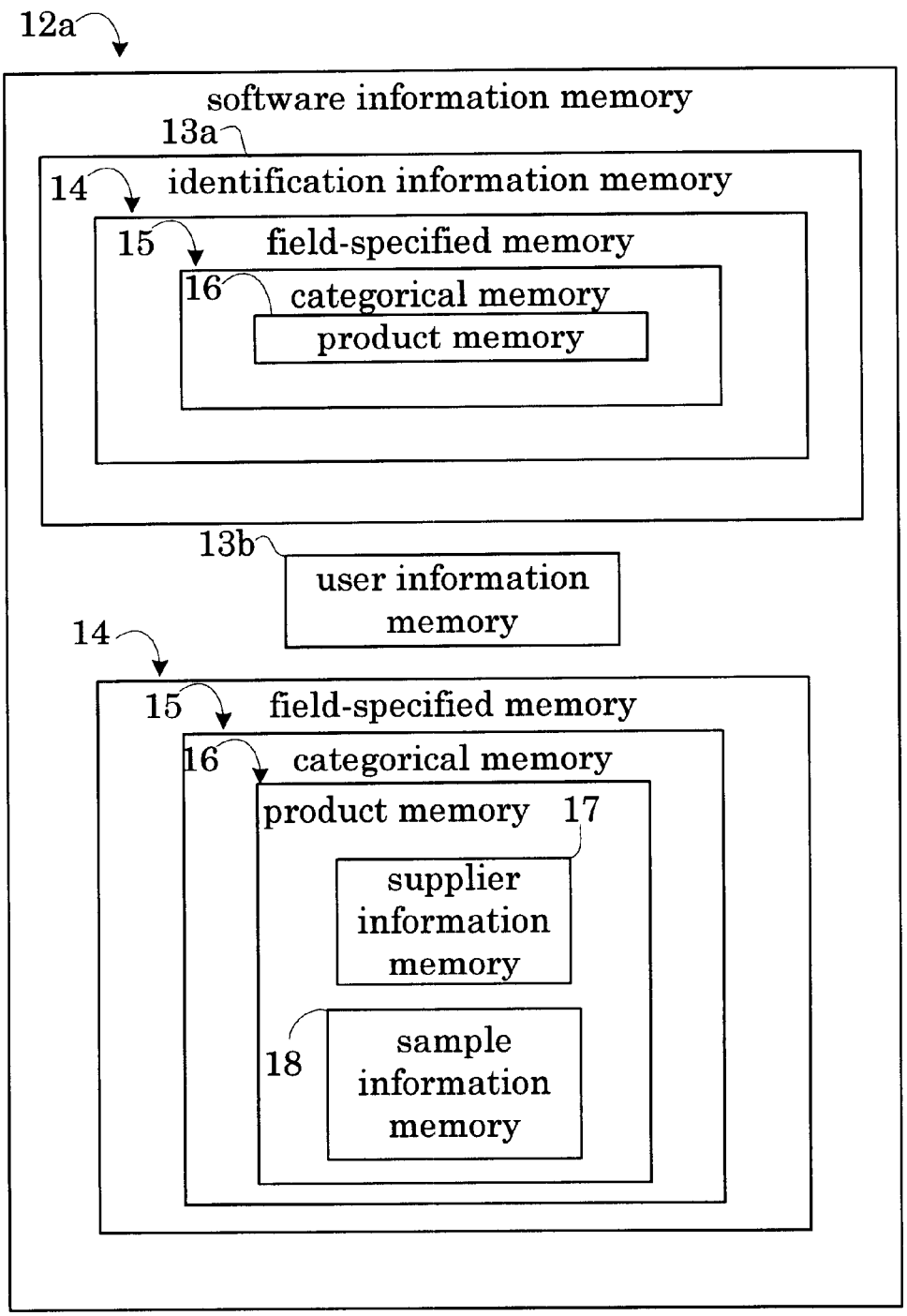
FIG. 19 is a schematic view of another modified software information memory.

For searching companies, as shown in FIG. 15, the identification information memory 13a storing identification information is incorporated into the supplier information memory 17 in the product memory 16 at the bottom of the hierarchical order. As shown in the schematic view of FIG. 19, it is also possible to hierarchize the identification information memory 13a per se. With the above structure of software information memory 12a, the keyword searcher 11d of search unit 11 first accesses the identification information memory 13a, and then searches the fields, categories and software products in the stated order.

Translation

The translation service will be described next. As shown in FIG. 1, the host computer 2 includes a translation unit 51 for translating the software information stored in the software information memory 12a and other, scientific information relating to scientific fields into different languages. When a request for translation is received from the supplier or user, the translation unit 51 translates specified information. The languages handled by the translation unit 51 include, without being limited to, Japanese and English, for example. The translation unit 51 corresponds to the translating device in this invention.

The supplier or user first starts the software information screen 19 on the uploading computer 1 or viewing computer 3, and then clicks on the translation reception screen jump button 41 on the top page screen 19A shown in FIG. 5 or the translation reception screen jump button 26b among the jump buttons 26 shown in FIG. 10 or 17. Then, the supplier or user enters identification information, in the case of a company, on a translation reception screen not shown. After designating information to be translated, the supplier or user clicks a request button (not shown) on the translation reception screen to complete the request for translation.

Upon receipt of the request for translation, the translation unit 51 translates the information specified. In translating home pages, for example, the translation unit 51 may translate the home page of a U.S. or European company into Japanese, and the home page of a Japanese company into English.

Since the translation unit 51 can translate information into different languages, the user may view, on the viewing computer 3, software information from abroad as well as from the home country, or transmit such software information to the host computer 2. Thus, the system in this embodiment may be used worldwide.

The advertisement reception, purchase of mail magazines, viewing of information on academic societies and exhibitions are not described herein. The memories storing scientific information which is information relating to these scientific fields, such as the academic society and exhibition information memory 12b and advertisement information memory 12c, may be hierarchized as is the identification information memory 13a, to enable efficient searching and viewing of the scientific information.

Trial Report Input

As described in relation to "Product description screen 19D", the user may input results of a tryout of a software product as a trial report. When the user clicks on the trial report button 32, access is made to a screen (not shown) for inputting a trial report. The trial report and user information such as user's name and address are transmitted via the control unit 5 and communication line 4 to the host computer 2 and stored in the user information memory 13b shown in FIG. 1. By clicking on the trial report button 32, the user may view the trial report and user information such as user name stored in the user information memory 13b. The supplier may improve the software product by reflecting the trial report from the user on the software product. It is to be noted that access may be made to the screen for inputting trial reports, also by clicking on a trial report reception jump button (not shown) on the top page screen 19A.

Figure 20:
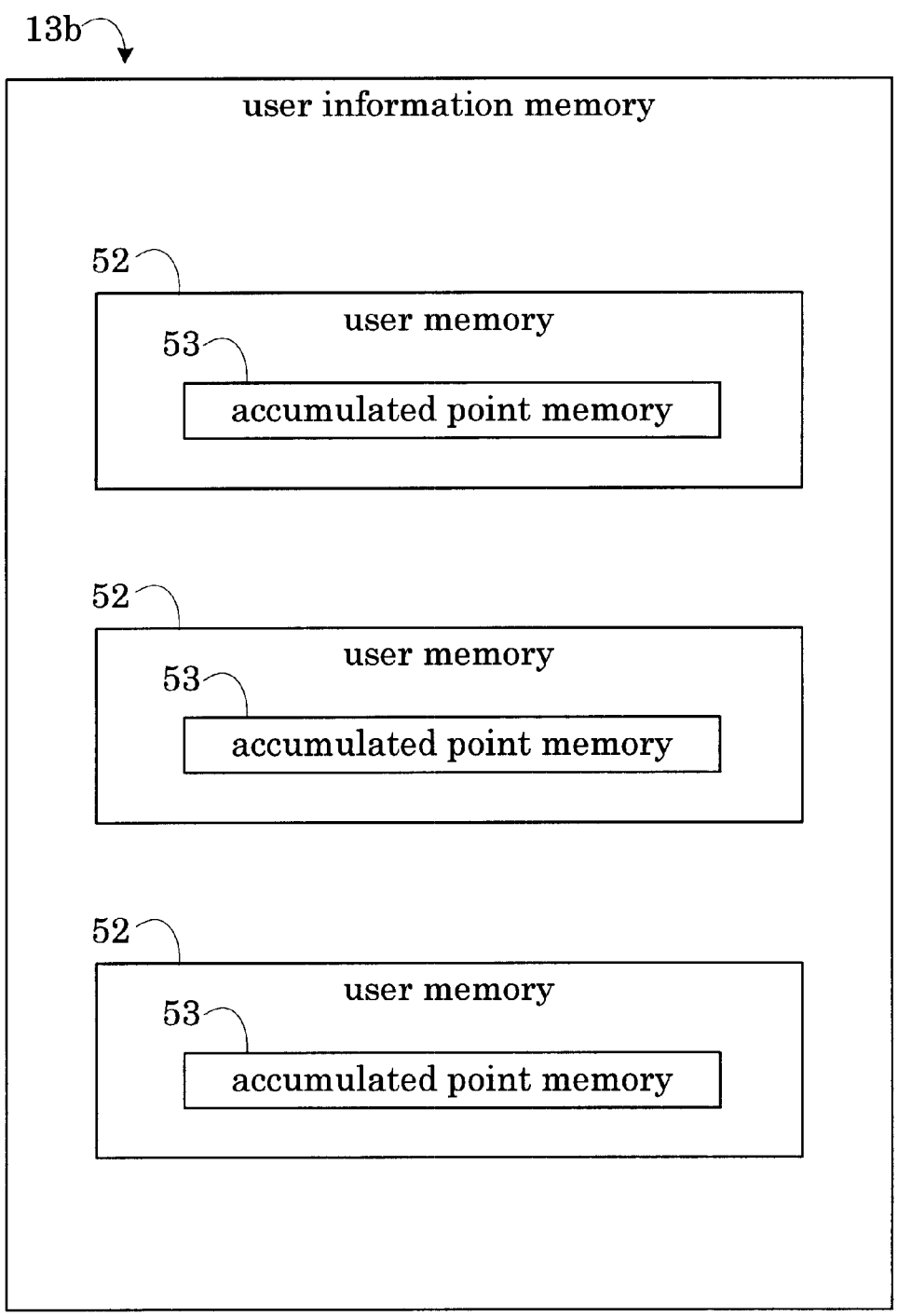
FIG. 20 is a schematic view of a user information memory having an incentive scheme function.

Further, an incentive scheme function may be added to the system in this embodiment. As shown in FIG. 20, for example, the user information memory 13b may be hierarchized for each user name, resulting in user memories 52 under user names. Each user memory 52 relating to a user name includes an accumulated point memory 53 for storing points given according to trial reports. With this construction, points are added to the accumulated point memory 53 in the user memory 52 whenever the user inputs a trial report. The host computer 2 includes a device for notifying the host computer 2 that a certain point count has been reached. The user may be given scientific information in return for the trial reports provided (e.g. a software product given free of charge). This scheme may encourage access from users.

(2) In the system in this embodiment described above, access is made from the top page screen 19A shown in FIG. 5 to the screen for searching software information or uploading software information (or registering software products). As described in relation to the jump buttons 26, access may be made to the screen for searching software information or registering software products, by clicking on one of the jump buttons 26 on the software information search result screen 19C shown in FIG. 10 or the company search result screen 19G shown in FIG. 17.

The software information search result screen 19C and company search result screen 19G include the jump buttons 26 arranged in the lower portions thereof, respectively. Such jump buttons 26 may be installed also on each of the screens 19A, 19B, 19D, 19E, 19F and 19H to allow access to be made to and from these screens.

(3) The system in the above embodiment has been described, citing a URL for demonstration downloading, company name, supplier's address, supplier's fax number, supplier's URL and e-mail address as examples of identification information. Such supplier identification information is not limitative, but may include company's telephone numbers, for example.

Similarly, the system in the above embodiment has been described, citing demonstration downloading, selling points and product summaries as sample information. Such sample information is not limitative, but may include product prices, for example. The system in the above embodiment has been described, citing a trial report and user's name and address as user information. Such user information is not limitative, but may include user's e-mail address, for example.

The present invention may be embodied in other specific forms without departing from the spirit or essential attributes thereof and, accordingly, reference should be made to the appended claims, rather than to the foregoing specification, as indicating the scope of the invention.

What is claimed is:

1. A scientific information viewing system comprising an uploading computer for uploading scientific information which is information relating to scientific fields, a host computer for storing the scientific information, and a viewing computer for viewing the scientific information, the computers being interconnected through communication lines, wherein:

said uploading computer includes first display/input means for displaying and inputting the scientific information;

said host computer includes storage means for storing the scientific information and search means for searching and retrieving given scientific information from said storage means, said storage means including a heirarchizing unit for heirarchizing at at least three levels of field, category and software product and a software information memory unit including an identification information memory, a user information memory and a field-specific memory, the search means including a field searcher, a category searcher, a product searcher and a keyword searcher;

said viewing computer includes second display/input means for displaying the scientific information and inputting search information for searching the scientific information;

said uploading computer transmitting the scientific information inputted by said first display/input means to said host computer through one of said communication lines;

said host computer hierarchizing the scientific information and storing the scientific information in said storage means;

said viewing computer transmitting the search information inputted by said second display/input means to said host computer through the other communication line;

said host computer searching the scientific information stored in said storage means, based on the search information, and transmitting search results to said viewing computer through the other communication line; and said viewing computer displaying the search results for browsing.

2. A scientific information viewing system as defined in claim 1, wherein said scientific information includes software information which is information on software for use in scientific fields.

3. A scientific information viewing system as defined in claim 2, wherein said software information includes sample information for trying out software.

4. A scientific information viewing system as defined in claim 2, wherein said software information includes user information which is information on users.

5. A scientific information viewing system as defined in claim 2, wherein said uploading computer transmits supplier identification information inputted by said first display/input means to said host computer through said one of said communication lines, said host computer transmitting search results on the software information included in the scientific information, and supplier identification information corresponding to the software information retrieved, to said viewing computer through the other communication line.

6. A scientific information viewing system as defined in claim 1, wherein said scientific information includes academic society and exhibition information which is information on academic societies and exhibitions.

7. A scientific information viewing system as defined in claim 1, wherein said scientific information includes advertisement information which is information on advertisements.

8. A scientific information viewing system as defined in claim 1, wherein said host computer includes translating means for translating the scientific information into different languages.

9. A host computer for use in a scientific information viewing system including an uploading computer for uploading scientific information which is information relating to scientific fields and a viewing computer for viewing the scientific information, the computers being interconnected through communication lines, the uploading computer including first display/input means for displaying and inputting the scientific information, the viewing computer including second display/input means for displaying the scientific information and inputting search information for searching the scientific information, the host computer comprising:

storage means for storing scientific information including a heirarchizing unit for heirarchizing at at least three levels of field, category and software product and a software information memory unit including an identification information memory, a user information memory and a field-specific memory; and search means for searching and retrieving given scientific information from said storage means, the search means including a field searcher, a category searcher, a product searcher and a keyword searcher.

* * * * *